(12) United States Patent
Shimohara

(10) Patent No.: US 9,643,404 B2
(45) Date of Patent: May 9, 2017

(54) PIGMENT DISPERSION COMPOSITION, INKJET RECORDING METHOD, AND METHOD FOR PRODUCING COMPOUND

(71) Applicant: FUJIFILM Corporation, Tokyo (JP)

(72) Inventor: Norihide Shimohara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/074,122

(22) Filed: Mar. 18, 2016

(65) Prior Publication Data

US 2016/0200926 A1 Jul. 14, 2016

Related U.S. Application Data

(63) Continuation of application No. PCT/JP2014/073672, filed on Sep. 8, 2014.

(30) Foreign Application Priority Data

Sep. 30, 2013 (JP) ................. 2013-205346

(51) Int. Cl.
| | |
|---|---|
| *B41J 2/01* | (2006.01) |
| *C09D 11/107* | (2014.01) |
| *C09D 11/322* | (2014.01) |
| *C09D 11/326* | (2014.01) |
| *C09D 17/00* | (2006.01) |
| *C09D 11/101* | (2014.01) |
| *C09D 11/102* | (2014.01) |

(52) U.S. Cl.
CPC .............. *B41J 2/01* (2013.01); *C09D 11/101* (2013.01); *C09D 11/102* (2013.01); *C09D 11/107* (2013.01); *C09D 11/322* (2013.01); *C09D 11/326* (2013.01); *C09D 17/00* (2013.01)

(58) Field of Classification Search
CPC ........ B41J 2/01; C09D 11/107; C09D 11/102; C09D 11/101; C09D 11/322; C09D 17/00; C09D 11/326
See application file for complete search history.

(56) References Cited

U.S. PATENT DOCUMENTS

| | | | | |
|---|---|---|---|---|
| 8,293,837 | B2 * | 10/2012 | Shimohara | C08G 18/3215 523/160 |
| 2011/0146516 | A1 * | 6/2011 | Kawauchi | G03F 7/027 101/453 |
| 2012/0320137 | A1 * | 12/2012 | Fujii | B41J 2/16552 347/100 |

FOREIGN PATENT DOCUMENTS

| | | |
|---|---|---|
| JP | H04-159611 A | 6/1992 |
| JP | 2008-013725 A | 1/2008 |
| JP | 2009-233486 A | 10/2009 |
| JP | 2012-201730 A | 10/2012 |

OTHER PUBLICATIONS

Translation of Written Opinion of PCT/JP2014/073672 mailed Dec. 2, 2014.
International Preliminary Report on Patentability of PCT/JP2014/073672 mailed Apr. 5, 2016.
The extended European search report issued by the European Patent Office on Jun. 21, 2016, which corresponds to European Patent Application No. 14849699.5-1302.
International Search Report of PCT/JP2014/073672 mailed Dec. 2, 2014.
Written Opinion of PCT/JP2014/073672 mailed Dec. 2, 2014.

* cited by examiner

*Primary Examiner* — Henok Legesse
(74) *Attorney, Agent, or Firm* — Studebaker & Brackett PC

(57) ABSTRACT

A pigment dispersion composition contains a pigment, a polymerizable compound, and a compound having a structural unit represented by Formula (A), a structural unit represented by Formula (B), a structural unit represented by Formula (C) derived from polyalkylene oxide having a number average molecular weight of equal to or greater than 300 and less than 5,000, and a structural unit represented by Formula (D), in which a mass ratio [(B)/(C)] is 20/80 to 60/40.

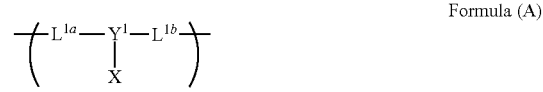

Formula (A)

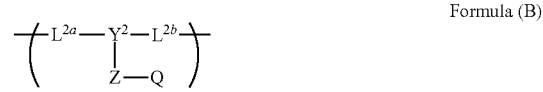

Formula (B)

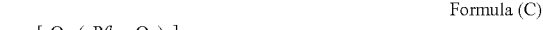

Formula (C)

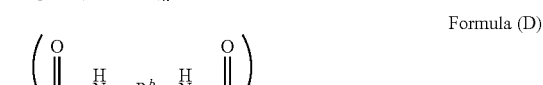

Formula (D)

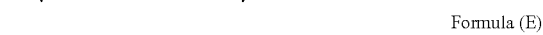

Formula (E)

14 Claims, No Drawings

PIGMENT DISPERSION COMPOSITION, INKJET RECORDING METHOD, AND METHOD FOR PRODUCING COMPOUND

CROSS-REFERENCE TO RELATED APPLICATIONS

This application is a Continuation of PCT International Application No. PCT/JP2014/073672 filed on Sep. 8, 2014, which claims priority under 35 U.S.C §119(a) to Japanese Patent Application No. 2013-205346 filed on Sep. 30, 2013. Each of the above applications is hereby expressly incorporated by reference, in its entirety, into the present application.

BACKGROUND OF THE INVENTION

1. Field of the Invention

The present invention relates to a pigment dispersion composition, an inkjet recording method, and a method for producing a compound.

2. Description of the Related Art

In recent years, as an image recording method for forming an image on a recording medium based on image data signals, an inkjet recording method has drawn attention. The inkjet recording method has advantages of making small noise and being able to record a high-definition image at low running costs by ejecting extremely small liquid droplets.

According to the inkjet recording method, printing can be performed not only on plain paper but also on a recording medium not absorbing liquid such as a plastic sheet or a metal plate. However, in order to increase the printing speed and improve the image quality, the time taken for drying or curing is required to be shortened. As one of the inkjet methods that meet such requirements, there is a recording method in which an ink that can be cured in a short time by being irradiated with actinic energy rays is used as an inkjet recording ink. According to this method, by curing ink droplets by the irradiation of actinic energy rays immediately after printing, a sharp image can be formed. The curable inkjet recording ink described above is required to have high pigment dispersibility and temporal stability of the dispersed pigment, such that a high-definition image having excellent color developability is formed, and the ink is stably ejected.

In order to impart a vivid color tone and high coloring power to the ink, it is essential to finely pulverize the pigment. Particularly, in a case of the inkjet recording ink, the ejected ink droplets exert a great influence on the sharpness of an image. Therefore, the ink droplets are ejected in a small amount, and it is essential to use fine particles having a size smaller than a film thickness of the cured ink film formed of the ink. However, if the pigment particles are more finely pulverized to obtain high coloring power as described above, it is difficult to disperse the fine particles, and aggregates are easily generated. Furthermore, there is also a problem in that the viscosity of the ink increases due to the addition of an excess of dispersing agent. Both the generation of the pigment aggregates and the increase in viscosity of the ink exert a negative influence on the ink ejectability. Accordingly, it is not preferable to use an ink which causes pigment aggregation, viscosity increase, and the like as an inkjet recording ink.

In a case of an actinic energy ray-curable type ink jet recording ink (hereinafter, simply referred to as a "curable type ink"), curability for forming a sharp image or film properties after curing are also important factors. In a case of the curable type ink, the ink is rapidly cured by being irradiated with actinic energy rays so as to secure sharpness of an image. Therefore, it is not preferable to use a pigment dispersing agent which hinders curing or a pigment dispersing agent which contains a solvent as a non-curable component, because such an agent reduces curability and causes bleeding or reduction in productivity.

Particularly, in a case of the curable type ink containing a solvent as a non-curable component, the curing sensitivity is reduced due to a plasticizing effect, and the concentration of the ink changes during storage due to the volatilization of the solvent component. Furthermore, the curable type ink causes ejection failure and a so-called blocking phenomenon in which in a case where printed matters (those obtained by performing printing on recording media) are stored by being stacked on each other, a printing surface of a printed matter adheres to a non-printing surface of another printed matter and thus the printing surface and the non-printing surface in the adherend are contaminated. Therefore, it is preferable to use a pigment dispersing agent not containing an organic solvent as far as possible.

In this respect, there is a demand for a curable type ink which can excellently disperse a finely pulverized pigment, has excellent dispersion stability, and uses a pigment dispersing agent not containing an organic solvent as far as possible. As the pigment dispersing agent, various compounds have been suggested.

For example, a pigment dispersing agent is known which is obtained by reacting a compound, which has a hydroxyl group and a pigment-adsorbing partial structure, with a polymer, which is selected from aliphatic polyester, poly (meth)acrylate, and polyether and has a hydroxyl group or a primary amino group, and an isocyanate compound which has two or more functional groups in a polymerizable compound (for example, see JP2009-233486A). By synthesizing polyurethane in a polymerizable compound such as an acryl monomer, the content of the organic solvent in the pigment dispersing agent is reduced.

Furthermore, a pigment dispersing agent for a printing ink is known which includes a main chain, which is composed of a polyurethane resin and/or a polyurea resin having one or more kinds of groups selected from the group consisting of an amino group, an imino group, and a monovalent or divalent aromatic hydrocarbon group, and a side chain which is composed of a graft polymer including a polyether skeleton and/or a polyester skeleton (for example, see JP2008-13725A). By performing a step of distilling away the organic solvent, the content of the organic solvent in the pigment dispersing agent is reduced.

SUMMARY OF THE INVENTION

However, in the pigment dispersing agent described in JP2009-233486A, the organic solvent is used in a part of the production process. Therefore, further improvement is required. In addition, in the pigment dispersing agent described in JP2008-13725A, the step of distilling away the organic solvent needs to be performed. Accordingly, from the viewpoint of the production suitability, it cannot be mentioned that the pigment dispersing agent is preferable.

Currently, many of the commercially available solventless pigment dispersing agents are polymers having a relatively low glass transition temperature (Tg) such as wax. In a case where the polymers are used in the curable type ink, the lower the Tg of the polymers as the pigment dispersing agent, the easier it is for the blocking phenomenon to occur. In order to improve blocking resistance, a method of increasing Tg of the polymers as the pigment dispersing agent is considered. However, in many cases, it is difficult to polymerize polymers having high Tg without a solvent.

The present invention has been made in consideration of the circumstances described above and aims to accomplish the following objects.

That is, an object of the present invention is to provide a pigment dispersion composition and an inkjet recording method that form a cured film having excellent blocking resistance and adhesiveness.

Another object of the present invention is to provide a method for producing a compound that produces a compound, which can excellently and stably disperse a pigment as a coloring component of a pigment dispersion composition, without a solvent (without using an organic solvent).

Specific means for accomplishing the aforementioned objects is as follows.

<1> A pigment dispersion composition containing a pigment, a polymerizable compound, and a compound having a structural unit represented by the following Formula (A), a structural unit represented by the following Formula (B), a structural unit represented by the following Formula (C) derived from polyalkylene oxide having a number average molecular weight of equal to or greater than 300 and less than 5,000, a structural unit represented by the following Formula (D), and a structural unit represented by the following Formula (E) in which a mass ratio [(B)/(C)] of the structural unit represented by Formula (B) to the structural unit represented by Formula (C) is 20/80 to 60/40.

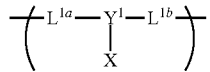

Formula (A)

In the formula (A), each of $L^{1a}$ and $L^{1b}$ independently represents —O— or —NR—; R represents a hydrogen atom or an alkyl group having 1 to 4 carbon atoms; X represents a tertiary amino group or a carboxy group; and $Y^1$ represents a trivalent linking group.

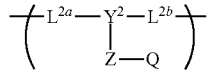

Formula (B)

In the formula (B), each of $L^{2a}$ and $L^{2b}$ independently represents —O— or —NH—; Q represents a group derived from poly(meth)acrylate having a glass transition temperature of equal to or higher than 50° C.; $Y^2$ represents a trivalent linking group; and Z represents a divalent linking group bonded to $Y^2$ and Q.

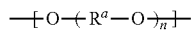

Formula (C)

In the formula (C), $R^a$ represents a linear or branched alkylene group having 2 to 4 carbon atoms, and n is the average addition number of moles of alkylene oxide and represents a number of 6 to 115.

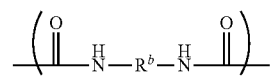

Formula (D)

In the formula (D), $R^b$ represents an alkylene group having 6 to 15 carbon atoms, an arylene group, a divalent linking group in which an arylene group is bonded to an arylene group, or a divalent linking group in which an alkylene group having 6 to 15 carbon atoms is bonded to an arylene group.

$$-(-L^{3a}-Y^3-L^{3b}-)-$$  Formula (E)

In the formula (E), each of $L^{3a}$ and $L^{3b}$ independently represents —O— or —NR—; R represents a hydrogen atom or an alkyl group having 1 to 4 carbon atoms.

$Y^3$ represents a divalent polycyclic aromatic hydrocarbon group bonded to $L^{3a}$ and $L^{3b}$.

<2> The pigment dispersion composition described in <1>, in which the ratio of the structural unit represented by Formula (A) to the total mass of all of the structural units of the compound is 2% by mass to 20% by mass.

<3> The pigment dispersion composition described in <1> or <2>, further containing an organic solvent in an amount of equal to or less than 3% by mass with respect to the total mass of the pigment dispersion composition.

<4> The pigment dispersion composition described in any one of <1> to <3>, in which the content of a monofunctional monomer in the polymerizable compound is 80% by mass to 100% by mass.

<5> The pigment dispersion composition described in any one of <1> to <4>, further containing a polymerization initiator.

<6> The pigment dispersion composition described in any one of <1> to <5> that is used as an ink.

<7> The pigment dispersion composition described in <6> that has viscosity of 3 mPa·s to 50 mPa·s at 25° C.

<8> The pigment dispersion composition described in <7> that is used as an inkjet recording ink.

<9> An inkjet recording method using the pigment dispersion composition described in any one of <6> to <8>.

<10> A method for producing a compound, including obtaining a polyalkylene oxide solution of poly(meth)acrylate by synthesizing poly(meth)acrylate having a structural unit represented by the following Formula (B) in polyalkylene oxide having a number average molecular weight of equal to or greater than 300 and less than 5,000 and having a structural unit represented by the following Formula (C); and mixing the obtained polyalkylene oxide solution of poly(meth)acrylate obtained by the above step, a compound having a structural unit represented by the following Formula (A), a compound having a structural unit represented by the following Formula (D), a compound having a structural unit represented by the following Formula (E), and a radically polymerizable compound to react therewith, in which a mass ratio [(B)/(C)] of the poly(meth)acrylate having the structural unit represented by Formula (B) to the polyalkylene oxide having the structural unit represented by Formula (C) is 20/80 to 60/40, and a value obtained by dividing the total number of moles of the compound having the structural unit represented by Formula (A), the poly (meth)acrylate having the structural unit represented by Formula (B), and the polyalkylene oxide having the structural unit represented by Formula (C) and the compound having a structural unit represented by the following Formula (E) by the number of moles of the compound having the structural unit represented by Formula (D) is 1.0 to 1.25.

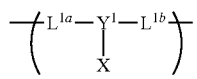

Formula (A)

In the formula (A), each of $L^{1a}$ and $L^{1b}$ independently represents —O— or —NR—; R represents a hydrogen atom or an alkyl group having 1 to 4 carbon atoms; X represents a tertiary amino group or a carboxy group; and $Y^1$ represents a trivalent linking group.

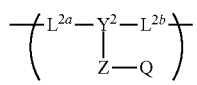

Formula (B)

In the formula (B), each of $L^{2a}$ and $L^{2b}$ independently represents —O— or —NH—; Q represents a group derived from poly(meth)acrylate having a glass transition temperature of equal to or higher than 50° C.; $Y^2$ represents a trivalent linking group; and Z represents a divalent linking group bonded to $Y^2$ and Q.

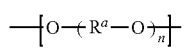

Formula (C)

In the formula (C), $R^a$ represents a linear or branched alkylene group having 2 to 4 carbon atoms, and n is the average addition number of moles of alkylene oxide and represents a number of 6 to 115.

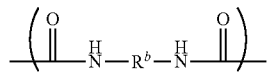

Formula (D)

In the formula (D), $R^b$ represents an alkylene group having 6 to 15 carbon atoms, an arylene group, a divalent linking group in which an arylene group is bonded to an arylene group, or a divalent linking group in which an alkylene group is bonded to an arylene group.

In the present specification, in a case where there is no description regarding whether a substituent (atomic group) is substituted or unsubstituted, unless otherwise specified, the substituent (atomic group) includes both the unsubstituted substituent (atomic group) and the substituent (atomic group) having a substituent. For example, in a case of a group described as an "alkyl group", the alkyl group means both the unsubstituted alkyl group and the alkyl group having a substituent. The same is true of other substituents (atomic groups).

In the present specification, "(meth)acrylate" means either or both of acrylate and methacrylate, and "(meth)acryl" means either or both of acryl and methacryl.

In the present specification, a range of numerical values described using "to" means a range which includes the numerical values listed before and after "to" as a lower limit and upper limit respectively.

In the present specification, in a case where the amount of each of the components in the composition is mentioned, if there is a plurality of substances corresponding to each of the components in the composition, unless otherwise specified, the total amount of the plurality of substances present in the composition is regarded as the amount of each of the components.

In the present specification, "adhesiveness" means the adhesiveness with respect to a recording medium.

In the present specification, "ejectability" (or "ejection stability") means ejectability (ejection stability) of an ink composition from an inkjet nozzle.

In the present specification, the term "step" includes not only an independent step but also a step which cannot be clearly differentiated from other steps as long as the intended object of the step is accomplished.

According to the present invention, there are provided a pigment dispersion composition and an inkjet recording method that form a cured film having excellent blocking resistance and adhesiveness.

Furthermore, according to the present invention, there is provided a method for producing a compound that produces a compound, which can excellently and stably disperse a pigment as a coloring component of a pigment dispersion composition, without a solvent (without using an organic solvent).

DESCRIPTION OF THE PREFERRED EMBODIMENTS

Hereinafter, specific embodiments of the present invention will be described in detail, but the present invention is not limited to the following embodiment. Within the intended scope of the present invention, the present invention can be embodied by being appropriately modified.

[Pigment Dispersion Composition]

The pigment dispersion composition of the present invention contains a pigment, a polymerizable compound, and a compound having a structural unit represented by the following Formula (A) (hereinafter, referred to as a "structural unit (A)" as appropriate), a structural unit represented by the following Formula (B) (hereinafter, referred to as a "structural unit (B)" as appropriate), a structural unit represented by the following Formula (C) derived from polyalkylene oxide having a number average molecular weight of equal to or greater than 300 and less than 5,000 (hereinafter, referred to as a "structural unit (C)" as appropriate), and a structural unit represented by the following Formula (D) (hereinafter, referred to as a "structural unit (D)" as appropriate), in which a mass ratio [(B)/(C)] of the structural unit (B) to the structural unit (C) is 20/80 to 60/40.

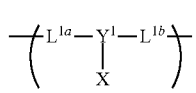

Formula (A)

In Formula (A), each of $L^{1a}$ and $L^{1b}$ independently represents —O— or —NR—; R represents a hydrogen atom or an alkyl group having 1 to 4 carbon atoms; X represents a tertiary amino group or a carboxy group; and $Y^1$ represents a trivalent linking group.

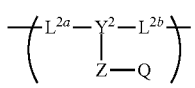

Formula (B)

In Formula (B), each of $L^{2a}$ and $L^{2b}$ independently represents —O— or —NH—; Q represents a group derived from poly(meth)acrylate having a glass transition temperature of equal to or higher than 50° C.; $Y^2$ represents a trivalent linking group; and Z represents a divalent linking group bonded to $Y^2$ and Q.

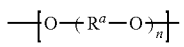

Formula (C)

In Formula (C), $R^a$ represents a linear or branched alkylene group having 2 to 4 carbon atoms, and n is the average addition number of moles of alkylene oxide and represents a number of 6 to 115.

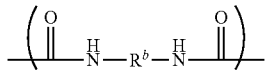

Formula (D)

In Formula (D), $R^b$ represents an alkylene group having 6 to 15 carbon atoms, an arylene group, a divalent linking group in which an arylene group is bonded to an arylene group, or a divalent linking group in which an alkylene group having 6 to 15 carbon atoms is bonded to an arylene group.

According to the pigment dispersion composition of the present invention, a cured film having excellent blocking resistance and adhesiveness can be formed. Furthermore, in a case where the pigment dispersion composition of the present invention is used as an ink, an image having excellent blocking resistance and adhesiveness can be recorded.

The pigment dispersion composition of the present invention contains the compound (hereinafter, referred to as a "specific polymer" as appropriate), which has the structural units (A), (B), (C), and (D) and in which a mass ratio of the structural unit (B) to the structural unit (C) is within a specific range, as a dispersing agent of the pigment and also contains the polymerizable compound as a dispersion medium of the pigment or the like.

In the pigment dispersion composition of the present invention, the specific polymer has the structural unit (B) having a glass transition temperature (hereinafter, referred to as "Tg" as appropriate) of equal to or higher than 50° C. It is considered that as a result, the blocking resistance becomes excellent.

Furthermore, it is considered that the structural unit (B) having high Tg contained in the specific polymer becomes a medium between an ink and the interface of a recording medium and thus makes a contribution to the film strength in the vicinity of the interface, and the structural unit (C) having low Tg makes a contribution to the stress relaxation properties. It is considered that as a result, in a case where the pigment dispersion composition of the present invention is used as an ink, the adhesiveness between a recording medium and a cured film (image in a case of an ink) is improved.

In addition, it is considered that because the specific polymer functions as a dispersing agent by having the structural unit (A) containing an adsorptive group and has the structural unit (B) as a graft chain at a specific ratio, the dispersion stability becomes excellent.

<Specific Polymer>

The pigment dispersion composition of the present invention contains the compound (specific polymer) having a structural unit represented by Formula (A) [structural unit (A)], the structural unit represented by Formula (B) [structural unit (B)], the structural unit represented by the following Formula (C) derived from polyalkylene oxide having a number average molecular weight of equal to or greater than 300 and less than 5,000 [structural unit (C)], and the structural unit represented by Formula (D) [structural unit (D)], in which the mass ratio [(B)/(C)] of the structural unit (B) to the structural unit (C) is 20/80 to 60/40.

According to the specific polymer, the pigment can be excellently and stably dispersed. Furthermore, the specific polymer makes a contribution to the blocking resistance and the adhesiveness of a cured film formed by using the pigment dispersion composition of the present invention.

Hereinafter, each of the structural units contained in the specific polymer will be described.

[Structural unit (A)]

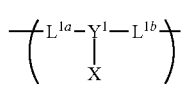

Formula (A)

In Formula (A), each of $L^{1a}$ and $L^{1b}$ independently represents —O— or —NR—. From the viewpoint of availability of the raw material, each of $L^{1a}$ and $L^{1b}$ is preferably —O—. R in —NR— represents a hydrogen atom or an alkyl group having 1 to 4 carbon atoms. From the viewpoint of the reactivity of a polymerization reaction, R is preferably a hydrogen atom.

X represents a tertiary amino group or a carboxy group. The group preferable as X varies with the surface state of the pigment. However, generally, in a case where the surface of the pigment is acidic, a tertiary amino group is preferably used, and in a case where the surface of the pigment is basic, a carboxy group is preferably used.

$Y^1$ represents a trivalent linking group. Examples of the trivalent linking group represented by $Y^1$ include groups obtained by removing three hydrogen atoms from an alkyl group or an aryl group that may have a substituent, an ether bond, a sulfide bond, an ester bond, or an amide bond. From the viewpoint of the reactivity or the availability of the raw material, a group is preferable which is obtained by removing three hydrogen atoms from an unsubstituted alkyl group or an alkyl group substituted with an alkyl group.

Furthermore, $Y^1$ is preferably a trivalent linking group represented by $-L^{1c}-Y^{1a}(-L^{1e}-*)-L^{1d}-$.

Each of $L^{1c}$, $L^{1d}$, and $L^{1e}$ independently represents a single bond, an alkylene group having 1 to 6 carbon atoms, or a phenylene group having 6 to 10 carbon atoms, and may have an ether bond, a sulfide bond, an ester bond, or an amide bond in a chain thereof. $Y^{1a}$ represents a carbon atom substituted with one of a hydrogen atom, an alkyl group having 1 to 6 carbon atoms, or an alkoxy group having 1 to 6 carbon atoms. * represents a position where $Y^1$ is bonded to X.

The specific polymer has the structural unit (A) having a tertiary amino group or a carboxy group which becomes an adsorptive group for the pigment. It is considered that accordingly, the specific polymer functions as a dispersing agent excellent in the dispersion stability of the pigment.

Specific examples of the structural unit (A) will be shown below, but the present invention is not limited thereto.

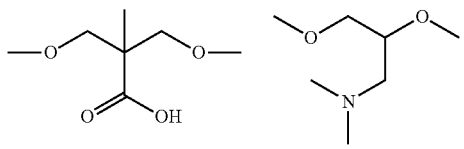

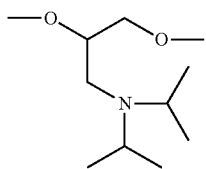

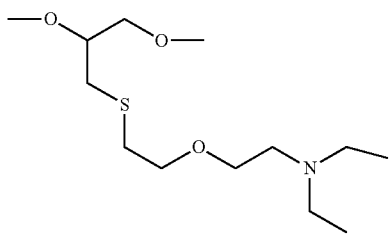

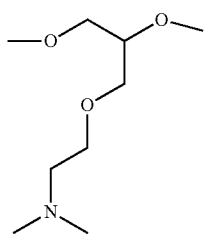

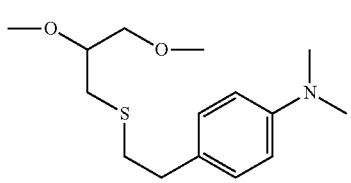

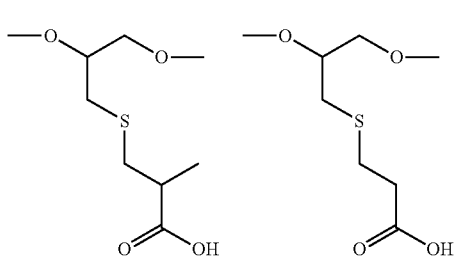

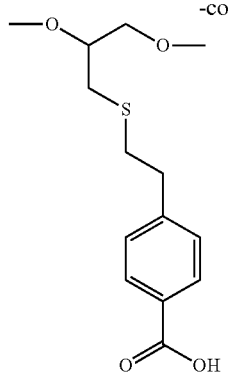

The ratio of the structural unit (A) to the total mass of all of the structural units of the specific polymer is preferably 2% by mass to 20% by mass, more preferably 2% by mass to 15% by mass, and even more preferably 5% by mass to 15% by mass.

If the ratio of the structural unit (A) is within the above range, the adsorptivity with respect to the pigment becomes better, and hence the dispersibility or the dispersion stability of the pigment is further improved.

[Structural unit (B)]

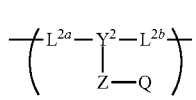

Formula (B)

In Formula (B), each of $L^{2a}$ and $L^{2b}$ independently represents —O— or —NH— and is preferably —O—.

Q represents a group derived from poly(meth)acrylate having a glass transition temperature of equal to or higher than 50° C.

Herein, the "group derived from poly(meth)acrylate" means a residue obtained by removing one hydrogen atom from a molecule constituting poly(meth)acrylate.

The glass transition temperature of the poly(meth)acrylate constituting Q is equal to or higher than 50° C., preferably equal to or higher than 60° C., more preferably equal to or higher than 60° C. and equal to or lower than 150° C., and even more preferably equal to or higher than 60° C. and equal to or lower than 120° C.

The specific polymer has the structural unit (B) having the group derived from poly(meth)acrylate having a glass transition temperature of equal to or higher than 50° C. It is considered that accordingly, the blocking resistance of the pigment dispersion composition of the present invention is excellent. If the glass transition temperature of the group derived from poly(meth)acrylate represented by Q is lower than 50° C., the blocking resistance deteriorates.

As the glass transition temperature, measured Tg obtained by actual measurement is applied. The glass transition temperature (measured Tg) is a value measured under general measurement conditions by using a differential scanning calorimeter (DSC) EXSTAR 6000 manufactured by Seiko Instruments Inc.

$Y^2$ represents a trivalent linking group. Examples of the trivalent linking group represented by $Y^2$ include groups obtained by removing three hydrogen atoms from an alkyl group or an aryl group that may have a substituent, an ether bond, an ester bond, an amide bond, a urethane bond, or a urea bond. From the viewpoint of the reactivity and the availability of the raw material, $Y^2$ is preferably a group obtained by removing three hydrogen atoms from an unsubstituted alkyl group or an alkyl group substituted with an alkyl group.

Furthermore, $Y^2$ is preferably a trivalent linking group represented by $-L^{2c}-Y^{2a}(-L^{2e}-*)-L^{2d}-$. Each of $L^{2c}$, $L^{2d}$, and $L^{2e}$ independently represents a single bond, an alkylene group having 1 to 6 carbon atoms, or a phenylene group having 6 to 10 carbon atoms and may have an ether bond, a sulfide bond, an ester bond, or an amide bond in a chain thereof. $Y^{2a}$ represents a carbon atom substituted with one of a hydrogen atom, an alkyl group having 1 to 6 carbon atoms, and an alkoxy group having 1 to 6 carbon atoms. * represents a position where $Y^2$ is bonded to Z.

Z represents a single bond or a divalent linking group bonded to $Y^2$ and Q. Examples of the divalent linking group represented by Z include —S— and the like.

Specific examples of the structural unit (B) will be shown below, but the present invention is not limited thereto.

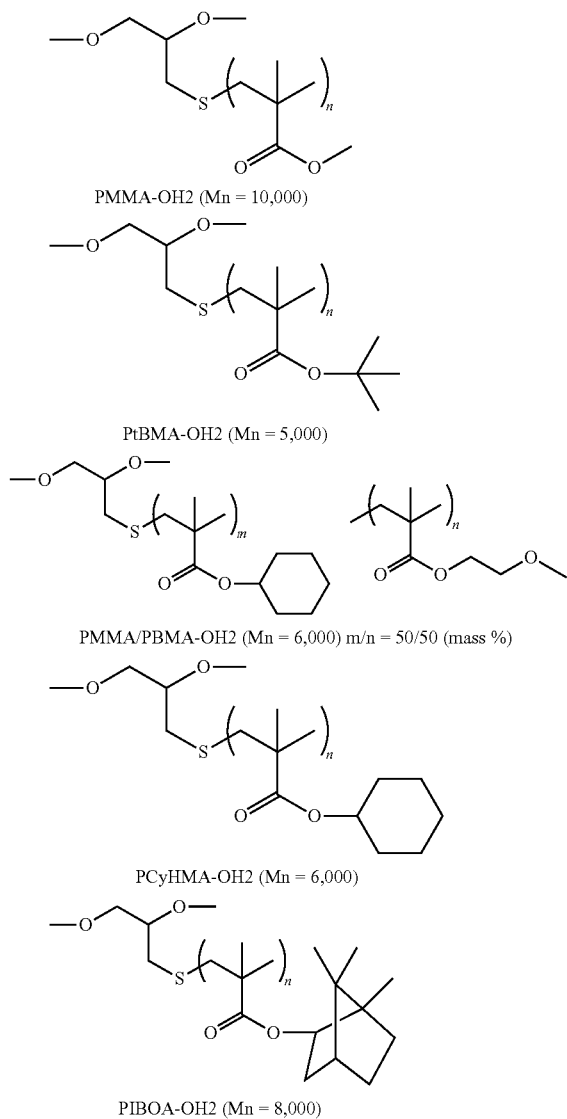

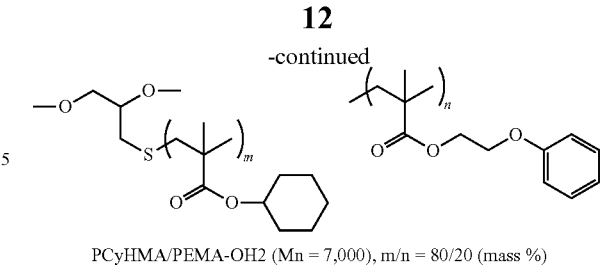

PCyHMA/PEMA-OH2 (Mn = 7,000), m/n = 80/20 (mass %)

The ratio of the structural unit (B) to the total mass of all of the structural units of the specific polymer is preferably 10% by mass to 50% by mass, more preferably 10% by mass to 40% by mass, and even more preferably 10% by mass to 35% by mass.

If the ratio of the structural unit (B) is within the above range, the affinity with a medium is improved, and hence the dispersibility or the dispersion stability of a pigment is further improved.

[Structural Unit (C)]

The structural unit (C) is a structural unit represented by the following Formula (C) derived from polyalkylene oxide having a number average molecular weight of equal to or greater than 300 and less than 5,000.

Formula (C)

In Formula (C), $R^a$ represents a linear or branched alkylene group having 2 to 4 carbon atoms. $R^a$ is preferably an alkylene group having 2 to 3 carbon atoms, and more preferably an alkylene group having 3 carbon atoms. From the viewpoint of the affinity with the radically polymerizable compound, $R^a$ is even more preferably a linear alkylene group having 3 carbon atoms.

n is the average addition number of moles of alkylene oxide and represents a number of 6 to 115. From the viewpoint of the solubility and the viscosity characteristics of the component (B), n is preferably 6 to 50 and more preferably 6 to 30.

The structural unit represented by Formula (C) is derived from polyalkylene oxide having a number average molecular weight (Mn) of equal to or greater than 300 and less than 5,000, and preferably derived from polyalkylene oxide having a number average molecular weight of equal to or greater than 300 and less than 2,000.

Because the specific polymer has the structural unit represented by Formula (C) derived from polyalkylene oxide having a number average molecular weight of equal to or greater than 300 and less than 5,000, that is, because the specific polymer has the structural unit (C), the cured film formed of the pigment dispersion composition of the present invention has excellent film properties.

The number average molecular weight is a value measured by gel permeation chromatography (GPC). Specifically, by using high-performance GPC (gel permeation chromatography) HPLC LC-10AD (manufactured by Shimadzu Corporation) and using Shodex GPC-KF-804 manufactured by SHOWA DENKO K.K. as a column and tetrahydrofuran (THF) as an eluant, the number average molecular weight is measured at a column temperature of 40° C. and a flow rate of 0.8 mL/sec. Furthermore, the number average molecular weight is calculated through the comparison with standard polystyrene.

A specific example of the structural unit (C) will be shown below, but the present invention is not limited thereto.

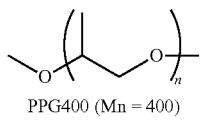

PPG400 (Mn = 400)

The ratio of the structural unit (C) to the total mass of all of the structural units of the specific polymer is preferably 10% by mass to 50% by mass, more preferably 15% by mass to 50% by mass, and even more preferably 20% by mass to 50% by mass.

If the ratio of the structural unit (C) is within the above range, the ratio of the component (B) to the structural unit (C) becomes within an appropriate range. Accordingly, the compound can be produced substantially without a solvent.

In the specific polymer, the mass ratio [(B)/(C)] of the structural unit (B) to the structural unit (C) is 20/80 to 60/40 and preferably 30/70 to 60/40.

If the mass ratio of the structural unit (B) to the structural unit (C) in the specific polymer is within the above range, the pigment dispersing agent can be produced substantially without a solvent. Furthermore, in a case where the pigment dispersion composition of the present invention is used as an ink, the adhesiveness between a recording medium and a cured film (image in a case of an ink) is improved.

In the specific polymer, the structural unit (B) having a high glass transition temperature becomes a medium between the ink and the interface of the recording medium and thus makes a contribution to the film strength in the vicinity of the interface. In contrast, the structural unit (C) having a low glass transition temperature makes a contribution to the stress relaxation properties. It is considered that the adhesiveness between the recording medium and the cured film (image in a case of an ink) is realized by the balance between the structural unit (B) and the structural unit (C).

If the ratio of the structural unit (B) is equal to or greater than the lower limit of the above range, the dispersion stability of the pigment by the specific polymer is improved.

[Structural unit (D)]

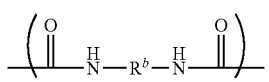

Formula (D)

In Formula (D), $R^b$ represents an alkylene group having 6 to 15 carbon atoms, an arylene group, a divalent linking group in which an arylene group is bonded to an arylene group, or a divalent linking group in which an alkylene group having 6 to 15 carbon atoms is bonded to an arylene group.

The alkylene group having 6 to 15 carbon atoms that is represented by $R^b$ may be linear or branched and may contain an alicyclic structure. $R^b$ is preferably an alkylene group having 6 to 14 carbon atoms.

The arylene group represented by $R^b$ is preferably an arylene group having 6 to 15 carbon atoms, and examples thereof include an unsubstituted phenylene group, a phenylene group substituted with a substituent such as an alkyl group, and the like.

From the viewpoint of the affinity with a medium, $R^b$ is preferably a branched alkylene group or an alkylene group containing an alicyclic structure.

Specific examples of the structural unit (D) will be shown below, but the present invention is not limited thereto.

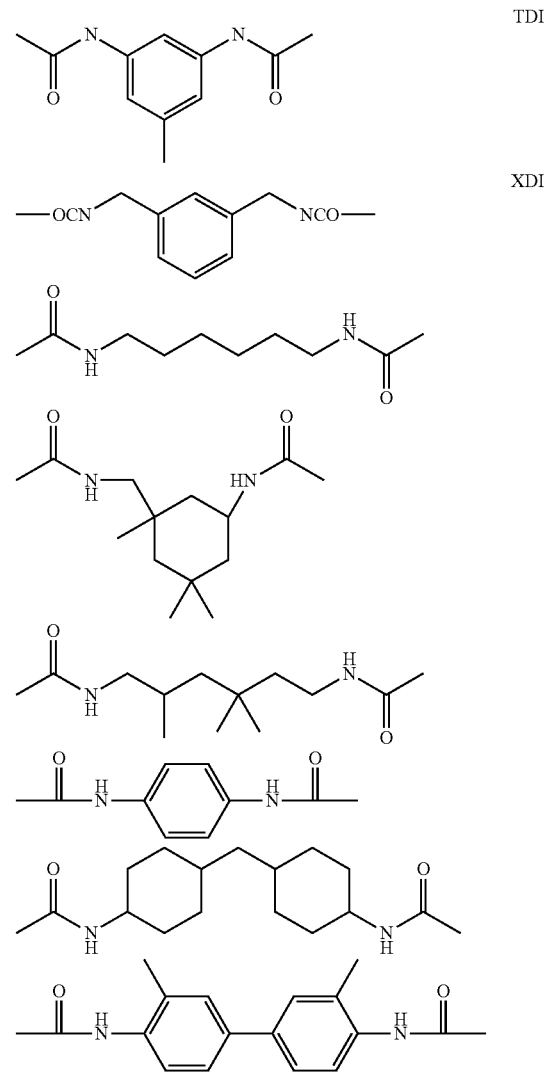

The ratio of the structural unit (D) to the total mass of all of the structural units of the specific polymer is preferably 10% by mass to 50% by mass, more preferably 10% by mass to 40% by mass, and even more preferably 15% by mass to 40% by mass.

[Structural Unit (E)]

It is preferable that the specific polymer further has a structural unit represented by Formula (E) (hereinafter, referred to as a "structural unit (E)" as appropriate).

$-L^{3a}-Y^3-L^{3b}-$  Formula (E)

In Formula (E), each of $L^{3a}$ and $L^{3b}$ independently represents —O— or —NR—, and is preferably —O—. R in —NR— represents a hydrogen atom or an alkyl group having 1 to 4 carbon atoms. From the viewpoint of the production suitability, R is preferably a hydrogen atom.

$Y^3$ represents a divalent polycyclic aromatic hydrocarbon group bonded to $L^{3a}$ and $L^{3b}$.

As the divalent polycyclic aromatic hydrocarbon group represented by $Y^3$, for example, groups obtained by removing two hydrogen atoms from naphthalene, anthracene, pyrene, acridone, quinacridone, anthraquinone, acridine, indole, benzothiazole, phenothiazine, and the like are preferable, and these may have a substituent. Among these, groups obtained by removing two hydrogen atoms from naphthalene, anthracene, or anthraquinone are preferable, and a group obtained by removing two hydrogen atoms from anthraquinone is more preferable.

By further having the structural unit (E) derived from a polycyclic aromatic compound, the specific polymer exhibits better adsorptivity with respect to the pigment. Therefore, the dispersibility or the dispersion stability of the pigment is further improved.

Specific examples of the structural unit (E) will be shown below, but the present invention is not limited thereto.

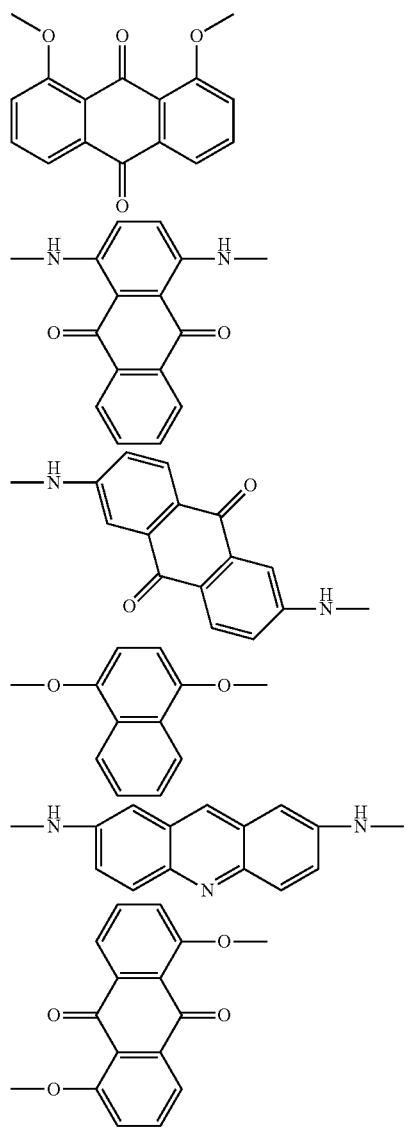

DHAQ

The ratio of the structural unit (E) to the total mass of all of the structural units of the specific polymer is preferably 2% by mass to 20% by mass, more preferably 2% by mass to 15% by mass, and even more preferably 2% by mass to 10% by mass.

If the ratio of the structural unit (E) is within the above range, the production suitability and the adsorptivity with respect to the pigment can be accomplished simultaneously.

[Method for Producing Specific Polymer]

The specific polymer can be produced by using, for example, a compound having the structural unit (A), poly(meth)acrylate having the structural unit (B), polyalkylene oxide having the structural unit (C), a compound having the structural unit (D), and preferably a compound having the structural unit (E) and heating and mixing these together if necessary in the presence of a known polymerization catalyst.

The specific polymer can be more preferably produced by a "method for producing a compound" of the present invention that will be described later.

A weight average molecular weight (Mw) of the specific polymer is preferably 10,000 to 200,000, more preferably 15,000 to 150,000, and even more preferably 20,000 to 100,000. If the weight average molecular weight of the specific polymer is within the above range, the dispersion stability of the pigment becomes excellent, and the viscosity of the specific polymer becomes appropriate.

The weight average molecular weight is a value measured by gel permeation chromatography (GPC). Specifically, by using high-performance GPC (gel permeation chromatography) HPLC LC-10AD (manufactured by Shimadzu Corporation) and using Shodex GPC-KF-804 manufactured by SHOWA DENKO K.K. as a column and tetrahydrofuran (THF) as an eluant, the weight average molecular weight is measured at a column temperature of 40° C. and a flow rate of 0.8 mL/sec. Furthermore, the weight average molecular weight is calculated through the comparison with standard polystyrene.

From the viewpoint of the stability of the pigment and the viscosity, the content of the specific polymer in the pigment dispersion composition of the present invention is preferably 0.5% by mass to 40% by mass, more preferably 0.5% by mass to 20% by mass, and even more preferably 0.5% by mass to 10% by mass, with respect to the total mass of the pigment dispersion composition.

<Polymerizable Compound>

The pigment dispersion composition of the present invention contains at least one kind of polymerizable compound.

Herein, the "polymerizable compound" refers to a compound having a polymerizable group.

In a case where the pigment dispersion composition of the present invention is used as an ink, as a dispersion medium of various components including the pigment, the polymerizable compound is used such that the adhesiveness of an image with respect to a recording medium becomes excellent. If the pigment dispersion composition contains an organic solvent, the organic solvent causes the deterioration of curability, plasticization of a cured film, blocking, and the like. Accordingly, it is preferable that the organic solvent that becomes a non-curable component is removed as much as possible.

In the pigment dispersion composition of the present invention, the polymerizable compound functions as a dispersion medium of various components including the pigment, and thus an organic solvent is unnecessary. Therefore, according to the pigment dispersion composition of the present invention, the volatilization of an organic solvent is not required, and the pigment dispersion composition can be directly used as a curable composition in a state where various components including the pigment remain dispersed.

The polymerizable compound is not particularly limited, and various polymerizable compounds such as a radically polymerizable compound, a cationically polymerizable compound, and an anionically polymerizable compound can be used as long as these compounds do not react with an isocyanate group. For the purpose of adjusting the reaction rate, the ink properties, the properties of the cured film, the dispersion stability of the pigment, and the like, one kind of the polymerizable compound can be used or a plurality of polymerizable compounds can be used by being mixed together. Furthermore, the polymerizable compound may be a monofunctional compound or a polyfunctional compound.

In the pigment dispersion composition of the present invention, as the polymerizable compound, it is possible to use various known radically polymerizable monomers that cause a polymerization reaction by a initiation species generated from a photo-radical initiator.

Examples of the radically polymerizable monomers include (meth)acrylates, (meth)acrylamides, vinyl ethers, aromatic vinyls, and the like.

Examples of the (meth)acrylates used as the radically polymerizable monomers include monofunctional (meth) acrylate, bifunctional (meth)acrylate, trifunctional (meth) acrylate, tetrafunctional (meth)acrylate, pentafunctional (meth)acrylate, hexafunctional (meth)acrylate, and the like.

Examples of the monofunctional (meth)acrylate include hexyl group (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, butoxymethyl (meth)acrylate, 3-methoxybutyl (meth)acrylate, alkoxymethyl (meth)acrylate, alkoxyethyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H, 1H, 2H, 2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth) acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, dimethylaminoethyl (meth)acrylate, diethylaminoethyl (meth)acrylate, dimethylaminopropyl (meth)acrylate, diethylaminopropyl (meth)acrylate, trimethylsilylpropyl (meth)acrylate, polyethylene oxide monomethyl ether (meth)acrylate, oligoethylene oxide monomethyl ether (meth)acrylate, polyethylene oxide monoalkyl ether (meth)acrylate, dipropylene glycol (meth) acrylate, polypropylene oxide monoalkyl ether (meth)acrylate, oligopropylene oxide monoalkyl ether (meth)acrylate, butoxydiethylene glycol (meth)acrylate, trichloroethyl (meth)acrylate, EO-modified phenol (meth)acrylate, EO-modified cresol (meth)acrylate, EO-modified nonylphenol (meth)acrylate, PO-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethy) (meth)acrylate, phenoxyethylene glycol (meth)acrylate, and the like.

Examples of the bifunctinoal (meth)acrylate include 1,6-hexanediol di(meth)acrylate, 1,10-decanediol di(meth)acrylate, neopentyl glycol di(meth)acrylate, 2,4-dimethyl-1,5-pentanediol di(meth)acrylate, butyl ethyl propanediol (meth)acrylate, ethoxylated cyclohexane methanol di(meth) acrylate, polyethylene glycol di(meth)acrylate, oligoethylene glycol di(meth)acrylate, ethylene glycol di(meth)acrylate, 2-ethyl-2-butyl-butanediol di(meth)acrylate, EO-modified bisphenol A di(meth)acrylate, bisphenol F polyethoxy di(meth)acrylate, polypropylene glycol di(meth) acrylate, oligopropylene glycol di(meth)acrylate, 1,4-butanediol di(meth)acrylate, 2-ethyl-2-butyl propanediol di(meth)acrylate, 1,9-nonane di(meth)acrylate, propoxylated ethoxylated bisphenol A di(meth)acrylate, tricyclodecane di(meth)acrylate, dipropylene glycol di(meth)acrylate, propoxylated neopentyl glycol di(meth)acrylate, and the like.

Examples of the trifunctinoal (meth)acrylate include trimethylolpropane tri(meth)acrylate, trimethylolethane tri (meth)acrylate, alkylene oxide-modified tri(meth)acrylate of trimethylolpropane, trimethylolpropane tri((meth)acryloyloxypropyl)ether, isocyanuric acid alkylene oxide-modified tri(meth)acrylate, propionic acid dipentaerythritol tri(meth) acrylate, tri((meth)acryloyloxyethyl)isocyanurate, propoxylated trimethylolpropane tri(meth)acrylate, ethoxylated glycerin tri(meth)acrylate, and the like.

Examples of the tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate, and the like.

Examples of the pentafunctional (meth)acrylate include sorbitol penta(meth)acrylate and dipentaerythritol penta(meth)acrylate.

Examples of the hexafunctional (meth)acrylate include dipentaerythritol hexa(meth)acrylate, sorbitol hexa(meth) acrylate, alkylene oxide-modified hexa(meth)acrylate of phosphazene, ε-caprolactone-modified dipentaerythritol hexa(meth)acrylate, and the like.

Examples of the (meth)acrylamides used as the radically polymerizable monomer include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth) acrylamide, N,N-dimethyl (meth)acrylamide, N,N-diethyl (meth)acrylamide, (meth)acryloylmorpholine, and the like.

Examples of the aromatic vinyls used as the radically polymerizable monomer include styrene, methylstyrene, dimethylstyrene, trimethylstyrene, ethylstyrene, isopropylstyrene, chloromethylstyrene, methoxystyrene, acetoxystyrene, chloro styrene, dichlorostyrene, bromostyrene, vinyl benzoic acid methyl ester, 3-methylsytrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, 4-t-butoxystyrene, and the like.

Examples of monofunctional vinyl ether compounds used as the radically polymerizable monomer include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, chloroethyl vinyl ether, chlorobutyl vinyl ether, chloroethoxyethyl vinyl ether, phenyl ethyl vinyl ether, phenoxypolyethylene glycol vinyl ether, and the like.

Examples of polyfunctional vinyl ether compounds used as the radically polymerizable monomer include divinyl ethers such as ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

Among the above polyfunctional vinyl ether compounds, from the viewpoint of the curability, the adhesiveness with a recording medium, the surface hardness of the formed image, and the like, a divinyl ether compound or a trivinyl ether compound is preferable, and a divinyl ether compound is more preferable. Because the vinyl ether compound described above is also cationically polymerizable, it can be preferably used as a cationically polymerizable monomer which will be described later.

Examples of the radically polymerizable monomers include vinyl esters [vinyl acetate, vinyl propionate, vinyl versatate, and the like], allyl esters [allyl acetate and the like], halogen-containing monomers [vinylidene chloride, vinyl chloride, and the like], vinyl cyanide [(meth)acrylonitrile and the like], and olefins [ethylene, propylene, and the like].

Among the above compounds, from the viewpoint of the curability and the storage stability, (meth)acrylates, (meth)acrylamides, and vinyl ethers are preferable as the polymerizable compound in the pigment dispersion composition of the present invention. Furthermore, from the viewpoint of the curing rate and the viscosity in a case where the pigment dispersion composition is used as an ink, it is preferable to concurrently use the (meth)acrylates, the (meth)acrylamides, and the vinyl ethers.

Examples of the cationically polymerizable monomer used as the polymerizable compound in the pigment dispersion composition of the present invention include the epoxy compounds, vinyl ether compounds, oxetane compounds, and the like described in JP1994-9714A (JP-H06-9714A), JP2001-31892A, JP2001-40068A, JP2001-55507A, JP2001-310938A, JP2001-310937A, and JP2001-220526A. Among these, from the viewpoint of the stability in the presence of isocyanate or an adsorptive functional group, a vinyl ether compound and an oxetane compound that do not react with a hydroxyl group or an adsorptive functional group are preferably used as the cationically polymerizable monomer. As the vinyl ether compound, the same vinyl ether compounds as exemplified above as the radically polymerizable monomers can be used.

The oxetane compounds used as the cationically polymerizable monomers refer to a compounds having an oxetane ring, and any of known oxetane compounds described in JP2001-220526A, JP2001-310937A, and JP2003-341217A can be selected and used. The compounds having an oxetane ring are preferably compounds having 1 to 4 oxetane rings in the structure thereof. If such compounds are used, the viscosity of the pigment dispersion composition of the present invention (particularly, the viscosity of the pigment dispersion composition used as an ink) can be easily maintained within a range in which the handleability thereof becomes excellent. Furthermore, in a case where the pigment dispersion composition of the present invention is used as an ink, the ink after curing can exhibit high adhesiveness with respect to a recording medium.

Examples of monofunctional oxetane used as the cationically polymerizable monomer include 3-(meth)allyloxymethyl-3-ethyl oxetane, (3-ethyl-3-oxetanylmethoxy)methyl benzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenylether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyl diethylene glycol (3-ethyl-3-oxetanylmethyl)ether, dicyclopentadiene (3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl (3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, bornyl(3-ethyl-3-oxetanylmethyl)ether, and the like.

Examples of polyfunctional oxetane used as the cationically polymerizable monomer include 3, 7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene (3-ethyl-3-oxetanylmethyl)ether, trimethylolpropane tris(3-ethyl-3-oxetanylmethyl)ether, 1,4-bis(3-ethyl-3-oxetanylmethoxy)butane, 1, 6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, EO-modified bisphenol F (3-ethyl-3-oxetanylmethyl)ether, bis{[1-ethyl(3-oxetanyl)]methyl}ether, and the like.

The compound having an oxetane ring described above is specifically described in paragraphs "0021" to "0084" of JP2003-341217A, and the compound described in the document can also be preferably used in the present invention.

Among the above compounds, from the viewpoint of the viscosity and the adhesiveness of the pigment dispersion composition (particularly, from the viewpoint of the viscosity and the adhesiveness of the pigment dispersion composition used as an ink), the compound having 1 to 2 oxetane rings is preferably used as the oxetane compound as the cationically polymerizable monomer.

From the viewpoint of improving the flexibility of the cured film obtained by curing the pigment dispersion composition of the present invention, the content of the monofunctional monomer in the polymerizable compound is preferably 80% by mass to 100% by mass, and more preferably 90% by mass to 100% by mass.

The content of the polymerizable compound in the pigment dispersion composition of the present invention is preferably 50% by mass to 95% by mass. From the viewpoint of the curability, the content of the polymerizable compound is preferably 70% by mass to 95% by mass, and more preferably 80% by mass to 95% by mass.

<Pigment>

The pigment dispersion composition of the present invention contains at least one kind of pigment.

Due to the action of the specific polymer described above, pigment particles having a small particle size are homogeneously and stably dispersed in the pigment dispersion composition. As a result, a sharp image having excellent color developability can be formed.

The pigment dispersion composition of the present invention contains the pigment as a colorant. Therefore, an image obtained in a case where the pigment dispersion composition of the present invention is used as an ink has excellent weather resistance.

The pigment is not particularly limited, and various known pigments can be appropriately selected and used according to the purpose. It is also possible to use all of the commercially available general organic and inorganic pigments, resin particles dyed with dyes, and the like. Furthermore, as long as the effects of the present invention are not impaired, it is possible to use commercially available pigment dispersions or surface-treated pigments such as those obtained by dispersing a pigment in an insoluble resin or the like as a dispersion medium and those obtained by grafting a resin onto the surface of a pigment. Examples of such pigments include the pigments described in "Pigment Dictionary" (Seishiro Ito, 2000), W. Herbst, K. Hunger "Industrial Organic Pigments", JP2002-12607A, JP2002-188025A, JP2003-26978A, and JP2003-342503A.

Examples of organic and inorganic pigments that have yellow color include monoazo pigments such as C. I. Pigment Yellow 1 (first yellow G or the like) and C. I. Pigment Yellow 74, disazo pigments such as C. I. Pigment Yellow 12 (disazo yellow or the like), C. I. Pigment Yellow 17, C. I. Pigment Yellow 97, C. I. Pigment Yellow 3, C. I. Pigment Yellow 16, C. I. Pigment Yellow 83, C. I. Pigment Yellow 155, and C. I. Pigment Yellow 219, azo lake pigments such as C. I. Pigment Yellow 100 (tartrazine yellow lake or the like), condensed azo pigments such as C. I. Pigment Yellow 95 (condensed azo yellow or the like), C. I. Pigment Yellow 93, C. I. Pigment Yellow 94, C. I. Pigment Yellow 128, and C. I. Pigment Yellow 166, acidic dye lake pigments such as C. I. Pigment Yellow 115 (quinoline yellow lake or the like), basic dye lake pigments such as C. I. Pigment Yellow 18 (thioflavin lake or the like), anthraquinone-based pigments such as flavanthrone yellow (Y-24), isoindolinone pigments such as isoindolinone yellow 3RLT (Y-110), quinophthalone pigments such as quinophthalone yellow (Y-138), isoindoline pigments such as isoindoline yellow (Y-139), nitroso pigments such as C. I. Pigment Yellow 153 (nickel nitroso yellow or the like), metal complex salt azomethine pigments such as C. I. Pigment Yellow 117 (copper azomethine yellow or the like), acetolone pigments such as C. I. Pigment Yellow 120 (benzimidazolone yellow), C. I. Pigment Yellow 151, C. I. Pigment Yellow 175, C. I. Pigment Yellow 180, C. I. Pigment Yellow 181, and C. I. Pigment Yellow 194, and the like.

Examples of pigments that having red or magenta color include monoazo pigments such as C. I. Pigment Red 3 (toluidine red or the like), B-naphthol pigments such as C. I. Pigment Red 1, C. I. Pigment Red 4, and C. I. Pigment Red 6, disazo pigments such as C. I. Pigment Red 38 (pyrazolone red B or the like), azo lake pigments such as C. I. Pigment Red 53:1 (lake red C or the like), C. I. Pigment Red 57:1 (brilliant carmine 6B or the like), C. I. Pigment Red 52:1, and C. I. Pigment Red 48 (B-oxynaphtoic acid lake or the like), condensed azo pigments such as C. I. Pigment Red 144 (condensed azo red or the like), C. I. Pigment Red 166, C. I. Pigment Red 220, C. I. Pigment Red 214, C. I. Pigment Red 221, and C. I. Pigment Red 242, acidic dye lake pigments such as C. I. Pigment Red 174 (phloxine B lake or the like) and C. I. Pigment Red 172 (erythrosine lake or the like), basic dye lake pigments such as C. I. Pigment Red 81 (rhodamine 6G' lake or the like), anthraquinone-based pigments such as C. I. Pigment Red 177 (dianthraquinonyl red or the like), thioindigo pigments such as C. I. Pigment Red 88 (thioindigo bordeaux or the like), perinone pigments such as C. I. Pigment Red 194 (perinone red or the like), perylene pigments such as C. I. Pigment Red 149 (perylene scarlet or the like), C. I. Pigment Red 179, C. I. Pigment Red 178, C. I. Pigment Red 190, C. I. Pigment Red 123, and C. I. Pigment Red 224, quinacridone pigments such as C. I. Pigment Violet 19 (unsubstituted quinacridone), C. I. Pigment Red 122 (quinacridone magenta or the like), C. I. Pigment Red 262, C. I. Pigment Red 207, and C. I. Pigment Red 209, isoindolinone pigments such as C. I. Pigment Red 180 (isoindolinone red 2BLT or the like), alizarine lake pigments such as C. I. Pigment Red 83 (madder lake or the like), naphtholone pigments such as C. I. Pigment Red 171, C. I. Pigment Red 175, C. I. Pigment Red 176, C. I. Pigment Red 185, and C. I. Pigment Red 208, naphthol AS-based lake pigments such as C. I. Pigment Red 247, naphthol AS pigments such as C. I. Pigment Red 2, C. I. Pigment Red 5, C. I. Pigment Red 21, C. I. Pigment Red 170, C. I. Pigment Red 187, C. I. Pigment Red 256, C. I. Pigment Red 268, and C. I. Pigment Red 269, diketopyrrolopyrrole pigments such as C. I. Pigment Red 254, C. I. Pigment Red 255, C. I. Pigment Red 264, and C. I. Pigment Red 27, and the like.

Examples of pigments having blue or cyan color include disazo-based pigments such as C. I. Pigment Blue 25 (dianisidine blue or the like), phthalocyanine pigments such as C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6, and C. I. Pigment Blue 16 (phthalocyanine blue or the like), acidic dye lake pigments such as C. I. Pigment Blue 24 (peacock blue lake or the like), basic dye lake pigment such as C. I. Pigment Blue 1 (Victoria pure blue BO lake or the like), anthraquinone-based pigments such as C. I. Pigment Blue 60 (indanthrone blue or the like), alkaline blue pigments such as C. I. Pigment Blue 18 (alkali blue V-5:1), and the like.

Examples of pigments having green color include phthalocyanine pigments such as C. I. Pigment Green 7 (phthalocyanine green) and C. I. Pigment Green 36 (phthalocyanine green), azo metal complex pigments such as C. I. Pigment Green 8 (nitroso green) and C. I. Pigment Green 10, and the like.

Examples of pigments having orange color include isoindoline-based pigments such as C. I. Pigment Orange 66 (isoindoline orange), anthraquinone-based pigments such as C. I. Pigment Orange 51 (dichloropyranthrone orange), B-naphthol pigments such as C. I. Pigment Orange 2, C. I. Pigment Orange 3, and C. I. Pigment Orange 5, naphthol AS pigments such as C. I. Pigment Orange 4, C. I. Pigment Orange 22, C. I. Pigment Orange 24, C. I. Pigment Orange 38, and C. I. Pigment Orange 74, isoindolinone pigments such as C. I. Pigment Orange 61, perinone pigments such as C. I. Pigment Orange 43, disazo pigments such as C. I. Pigment Orange 15 and C. I. Pigment Orange 16, quinacridone pigments such as C. I. Pigment Orange 48 and C. I. Pigment Orange 49, acetolone pigments such as C. I. Pigment Orange 36, C. I. Pigment Orange 62, C. I. Pigment Orange 60, C. I. Pigment Orange 64, and C. I. Pigment Orange 72, pyrazolone pigments such as C. I. Pigment Orange 13 and C. I. Pigment Orange 34, and the like.

Examples of pigments having brown color include naphtholone pigments such as C. I. Pigment Brown 25 and C. I. Pigment Brown 32 and the like.

Examples of pigments having black color include carbon black, titanium black, indazine pigments such as C. I. Pigment Black 1 (aniline black), perylene pigments such as C. I. Pigment Black 31 and C. I. Pigment Black 32, and the like.

As white pigments, for example, it is possible to use basic lead carbonate $(2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like. Inorganic particles used as the white pigment may be used alone or used in the form of complex particles with, for example, oxide of silicon, aluminum, zirconium, titanium, or the like, an organic metal compound, or organic compound.

Compared to other white pigments, titanium oxide has a smaller specific gravity and a greater refractive index and is chemically and physically stable. Therefore, as a pigment, titanium oxide has strong hiding power or coloring power and exhibits excellent durability with respect to an acid, an alkali, and other environments. Consequently, it is preferable to use titanium oxide as a white pigment. It goes without saying that other white pigments may be used if necessary (the white pigments may be pigments other than the white pigments exemplified above).

For dispersing the pigment, for example, it is possible to use a dispersing device such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, or a wet-type jet mill.

At the time of dispersing the pigment, the aforementioned specific polymer is added. Furthermore, at the time of adding the pigment, if necessary, synergists appropriate for various pigments can be used as a dispersion aid. The amount of the dispersion aid added is preferably 1 part by mass to 50 parts by mass with respect to 100 parts by mass of the pigment.

The smaller the average particle size of the pigment used in an ink other than a white ink, the better the color developability. Therefore, the average particle size of the pigment is preferably about 0.01 µm to 0.4 µm, and more preferably about 0.02 µm to 0.3 µm. The pigment, the above-described specific polymer functioning as a pigment dispersing agent, and the above-described polymerizable compound functioning as a dispersion medium are selected, and the dispersion conditions, filtering conditions, and the like are set, such that the maximum particle size of the pigment in the pigment dispersion composition preferably becomes equal to or less than 3 µm and more preferably becomes equal to or less than 1 µm.

From the viewpoint of imparting sufficient hiding power, the average particle size of the pigment used in a white ink is preferably about 0.05 µm to 1.0 µm, and more preferably about 0.1 µm to 0.4 µm. Likewise, in inks of other colors, the pigment, the above-described specific polymer functioning as a pigment dispersing agent, and the above-described polymerizable compound functioning as a dispersion medium are selected, and the dispersion conditions, filtering conditions, and the like are set, such that the maximum particle size of the pigment in the pigment dispersion composition preferably becomes equal to or less than 3 µm and more preferably becomes equal to or less than 1 µm.

If the particle size is controlled as described above, the clogging of a head nozzle can be inhibited, and the storage stability of the ink, the transparency of the ink, and the curing sensitivity of the ink can be maintained.

The pigment dispersion composition of the present invention contains the above-described specific polymer having excellent dispersibility and stability. Therefore, even in a case of using a fine particle pigment, the pigment is homogeneously and stably dispersed.

The particle size of the pigment in the pigment dispersion composition can be measured by a known measurement method. Specifically, the particle size can be measured by a centrifugal sedimentation light transmission method, an X-ray transmission method, a laser diffraction-scattering method, a dynamic light scattering method, or the like. Herein, the particle size of the aforementioned pigment refers to a value measured by a dynamic light scattering method.

In the pigment dispersion composition of the present invention, a mass ratio of the pigment to the specific polymer (pigment/specific polymer) is preferably 100/5 to 100/100, more preferably 100/10 to 100/50, and even more preferably 100/10 to 100/40. If the mass ratio of the pigment to the specific polymer in the pigment dispersion composition is within the above range, the dispersibility of the pigment particles becomes excellent. Furthermore, in a case where the pigment dispersion composition is cured, excellent coloring properties are exhibited.

In a case where the pigment is an organic pigment, the content of the pigment in the pigment dispersion composition of the present invention is preferably 1% by mass to 20% by mass and more preferably 1.5% by mass to 10% by mass in terms of solid content.

In a case where the pigment is an inorganic pigment, the content of the pigment in the pigment dispersion composition is preferably 1% by mass to 30% by mass and more preferably 2% by mass to 25% by mass in terms of solid content.

<Polymerization Initiator>

It is preferable that the pigment dispersion composition of the present invention further contains at least one kind of polymerization initiator. If the pigment dispersion composition contains the polymerization initiator, the curing sensitivity of the pigment dispersion composition can be improved.

The pigment dispersion composition of the present invention that further contains the polymerization initiator is cured by being heated or being irradiated with actinic energy rays. Herein, the actinic energy rays refer to the rays that can impart energy, which can generate an initiation species in the pigment dispersion composition, through the irradiation thereof. Examples of the actinic energy rays include a rays, y rays, X rays, ultraviolet rays, visible rays, electron beams, and the like.

The polymerization initiator is preferably a polymerization initiator of radical polymerization or cationic polymerization, and more preferably a photopolymerization initiator.

The photopolymerization initiator is a compound which causes a chemical change through the action of light or through the interaction with an electrical excitation state of a sensitizing dye, and generates at least one kind of species selected from the group consisting of a radical, an acid, and a base.

As the photopolymerization initiator, it is possible to appropriately select and use a compound which exhibits sensitivity with respect to the actinic rays radiated such as ultraviolet rays having a wavelength of 200 nm to 400 nm, far ultraviolet rays, g-line, h-line, i-line, KrF excimer laser beams, ArF excimer laser beams, electron beams, X rays, molecular beams, and ion beams.

From the viewpoint of the curing sensitivity and the availability of the device, the actinic rays irradiating the polymerization initiator in the pigment dispersion composition of the present invention are preferably ultraviolet rays and electron beams, and more preferably ultraviolet rays.

As a light source of ultraviolet rays, for example, a mercury lamp, a metal halide lamp, a light emitting diode (LED), a semiconductor laser, a fluorescent lamp, and the like are used. Among these, as the light source of ultraviolet rays used for the ink composition of the present invention, a mercury lamp, a metal halide lamp, and a light emitting diode are preferable, and a light source having an emission wavelength of 300 nm to 400 nm is more preferable.

As the photopolymerization initiator, the compounds known to those in the related art can be used without limitation. For example, it is possible to use many compounds described in Bruce M. Monroe et al., Chemical Revue, 93, 435 (1993), R. S. Davidson, Journal of Photochemistry and biology A: Chemistry, 73. 81 (1993), J. P. Faussier "Photoinitiated Polymerization-Theory and Applications": Rapra Review vol. 9, Report, Rapra Technology (1998), and M. Tsunooka et al., Prog. Polym. Sci., 21, 1 (1996). Furthermore, it is possible to use chemically amplified photoresist described in "Organic materials for imaging" (The Japanese Research Association for Organic Electronics Materials, Bunshin-publishing, 1993, pp. 187~192) or the compounds used for cationic photopolymerization. In addition, a group of compounds described in F. D. Saeva, Topics in Current Chemistry, 156, 59 (1990), G G Maslak, Topics in Current Chemistry, 168, 1 (1993), H. B. Shuster et al, JACS, 112, 6329 (1990), I. D. F. Eaton et al, JACS, 102, 3298 (1980), and the like that oxidatively or reductively causes bond cleavage through the interaction with an electrical excitation state of a sensitizing dye can be used.

As the photopolymerization initiator, (i) aromatic ketones, (ii) an aromatic onium salt compound, (iii) an organic peroxide, (iv) a hexaarylbiimidazole compound, (v) a ketoxime ester compound, (vi) a borate compound, (vii) an azinium compound, (viii) a metallocene compound, (ix) an active ester compound, (x) a compound having a carbon-halogen bond, and the like are preferable. Examples thereof include the photopolymerization initiators described in paragraphs "0147" to "0225" of JP2010-13630A. Among these, from the viewpoint of the stability, the curing sensitivity, and the availability, as the photopolymerization initiator in the pigment dispersion composition of the present invention, (i) aromatic ketones are preferable. Among (i) aromatic ketones, a benzophenone compound, an α-aminoacetophenone compound, an acylphosphine oxide compound, and an α-hydroxyacetophenone compound are preferable. Furthermore, examples of commercially available photopolymerization initiators include the following compounds, and they can also be preferably used.

Examples of the benzophenone compound include benzophenone, Michler's ketone, ESACURE TZT (manufactured by Fratelli Lamberti), KAYACURE BMS (manufactured by Nippon Kayaku Co., Ltd.), and the like.

Examples of the α-aminoacetophenone compound include IRGACURE 369, IRGACURE 379, IRGACURE 907 (all manufactured by BASF Corporation), and the like.

Examples of the acylphosphine oxide compound include IRGACURE 819, DAROCUR TPO, LUCIRIN TPO, LUCIRIN TPO-L (all manufactured by BASF Corporation), bis (2,6-dimethoxybenzoyl)-2,4,4-trimethyl-pentylphenyl phosphine oxide, and the like.

Examples of the α-hydroxyacetophenone compound include IRGACURE 184, IRGACURE 127, IRGACURE 2959, DAROCUR 1173, DAROCUR 1116, DAROCUR 953 (all manufactured by BASF Corporation), and the like.

One kind of the polymerization initiator can be used along, or two or more kinds thereof can be used in combination. The content of the polymerization initiator in the pigment dispersion composition is preferably 0.1% by mass to 20% by mass, more preferably 0.5% by mass to 15% by mass, and even more preferably 1% by mass to 10% by mass, with respect to the total mass of the pigment dispersion composition.

<Organic Solvent>

As long as the effects of the present invention are not impaired, the pigment dispersion composition of the present invention may contain an extremely small amount of an organic solvent. However, it is preferable that the pigment dispersion composition is a solventless pigment dispersion composition which substantially does not contain an organic solvent. Specifically, the content of the organic solvent is preferably equal to or less than 3% by mass, more preferably equal to or less than 2% by mass, even more preferably equal to or less than 1% by mass, and most preferably 0% by mass, with respect to the total mass of the pigment dispersion composition.

Herein, the "organic solvent" refers to an organic solvent not having a radically polymerizable group such as an ethylenically unsaturated bond.

In the pigment dispersion composition of the present invention, the polymerizable compound functions as a dispersion medium for various components including the pigment. Therefore, even if the pigment dispersion composition substantially does not contain the organic solvent, various components including the pigment can be dispersed.

If the content of the organic solvent is within the above range, in a case where a cured film is formed by using the pigment dispersion composition of the present invention, the blocking phenomenon, the curing failure, the change of properties of the cured film over time, and the like do not easily occur.

<Other Additives>

In addition to the essential components such as the pigment, the polymerizable compound, and the specific polymer as well as the polymerization initiator, the pigment dispersion composition of the present invention can contain the following various additives according to the purpose.

(Polymerization Inhibitor)

The pigment dispersion composition of the present invention may contain a polymerization inhibitor.

In a case where the pigment dispersion composition is used as an inkjet recording ink, it is desirable that the pigment dispersion composition is ejected after being heated to 40° C. to 80° C. by an inkjet recording device such that the viscosity thereof is reduced. Therefore, although the pigment dispersion composition is ejected generally at the temperature within the above range, in order to prevent the head clogging caused by undesired thermal polymerization that occurs in a case of heating, it is preferable to add a polymerization inhibitor to the pigment dispersion composition.

Examples of the polymerization inhibitor include hydroquinone, benzoquinone, p-methoxyphenol, tetramethylpiperidin-1-oxyl (TEMPO), 4-hydroxy-2,2, 6, 6-tetramethylpiperidin-1-oxyl (TEMPOL), 4-hydroxy-2,2, 6, 6-tetramethylpiperidin-1-oxyl free radical (TEMPO-OH), aluminum-cupferron complex (cupferron Al), and the like.

In a case where the pigment dispersion composition of the present invention contains a polymerization inhibitor, the content of the polymerization inhibitor in the pigment dispersion composition is preferably 0.01% by mass to 1.0% by mass, and more preferably 0.01% by mass to 0.5% by mass, with respect to the total mass of the pigment dispersion composition.

(Sensitizing Dye)

For the purpose of improving the sensitivity of the photopolymerization initiator, the pigment dispersion composition of the present invention may contain a sensitizing dye. As the sensitizing dye, those belonging to the following compounds and having absorption in a wavelength range of 350 nm to 450 nm are preferable.

Examples of the sensitizing dye include polynuclear aromatic compounds (for example, pyrene, perylene, triphenylene, anthracene, and the like), xanthenes (for example, fluorescein, eosine, erythrosine, rhodamine B, rose bengal, and the like), cyanines (for example, thiacarbocyanine, oxacarbocyanine, and the like), merocyanines (for example, merocyanine, carbomerocyanine, and the like), thiazines (for example, thionine, methylene blue, toluidine blue, and the like), acridines (for example, acridine orange, chloroflavine, acriflavine, and the like), anthraquinones (for example, anthraquinone and the like), squaliums (for example, squalium and the like), and coumarins (for example, 7-diethylamino-4-methyl coumarin and the like).

For example, the sensitizing dyes described in paragraphs "0110" to "0116" of JP2009-233486A can be preferably used.

(Co-Sensitizer)

The pigment dispersion composition of the present invention may contain, as a co-sensitizer, a known compound, which functions to further improve the curing sensitivity or to inhibit the hindrance of polymerization by oxygen.

Examples of the co-sensitizer include the amines such as the compounds described in "Journal of Polymer Society" (M. R. Sander et al., vol. 10, p. 3173, 1972), JP1969-20189B (JP-S44-20189B), JP1976-82102A (JP-S51-82102A), JP1977-134692A (JP-S52-134692A), JP1984-138205A (JP-S59-138205A), JP1985-84305A (JP-S60-84305A), JP1987-18537A (JP-S62-18537A), JP1989-33104A (JP-S64-33104A), Research Disclosure No. 33825, and the like. More specifically, examples of the amine compounds include triethanolamine, p-dimethylaminobenzoic acid ethyl ester, p-formyldimethylaniline, p-methylthiodimethylaniline, and the like.

Examples of other co-sensitizers include thiols and sulfides such as the thiol compounds described in JP1978-702A (JP-S53-702A), JP1980-500806B (JP-S55-500806B), and JP1993-142772A (JP-H05-142772A) and the disulfide compounds described in JP1981-75643A (JP-S56-75643A). More specifically, examples of the thiol compounds and the sulfide compounds include 2-mercaptobenzothiazole, 2-mercaptobenzoxazole, 2-mercaptobenzimidazole, 2-mercapto-4(3H)-quinazoline, β-mercaptonaphthalene, and the like.

Examples of other co-sensitizers include an amino acid compound (for example, N-phenylglycine and the like), the organic metal compound (for example, tributyltin acetate and the like) described in JP1973-42965B (JP-S48-42965B), the hydrogen donator described in JP1980-34414B (JP-S55-34414B), the sulfur compound (for example, trithiane and the like) described in JP1994-308727A (JP-H06-308727A), the phosphorus compound (for example, diethyl phosphite and the like) described in JP1994-250387A (JP-H06-250387A), and the like.

(Ultraviolet Absorber)

From the viewpoint of improving the weather resistance of the obtained image and preventing fading, as long as the effects of the present invention are not impaired, an ultraviolet absorber may be used in the pigment dispersion composition of the present invention.

Examples of the ultraviolet absorber include the benzotriazole-based compounds described in JP1983-185677A (JP-S58-185677A), JP1986-190537A (JP-S61-190537A), JP1990-782A (JP-H02-782A), JP1993-197075A (JP-H05-197075A), and JP1997-34057A (JP-H09-34057A), the benzophenone-based compounds described in JP1971-2784A (JP-S46-2784A), JP1993-194483A (JP-H05-194483A), and U.S. Pat. No. 3,214,463A, the cinnamic acid-based compounds described in JP1973-30492B (JP-S48-30492B), JP1981-21141B (JP-S56-21141B), and JP1998-88106A (JP-H10-88106A), the triazine-based compounds described in JP1992-298503A (JP-H04-298503A), JP1996-53427A (JP-H08-53427A), JP1996-239368A (JP-H08-239368A), JP1998-182621A (JP-H10-182621A), and JP1996-501291A (JP-H08-501291A), the compound described in Research Disclosure No. 24239, the compounds represented by stilbene-based compounds or benzoxazole-based compounds that emit fluorescence by absorbing ultraviolet rays, so-called fluorescent whitening agents, and the like.

(Antioxidant)

From the viewpoint of improving the stability of the ink composition, as long as the effects of the present invention are not impaired, an antioxidant may be used in the pigment dispersion composition of the present invention.

Examples of the antioxidant include those described in EP223739A, EP309401A, EP309402A, EP310551A, EP310552A, EP459416A, DE3435443A, JP1979-48535A (JP-S54-48535A), JP1987-262047A (JP-S62-262047A), JP1988-113536A (JP-S63-113536A), JP1988-163351A (JP-S63-163351A), JP1990-262654A (JP-H02-262654A), JP1990-71262A (JP-H02-71262A), JP1991-121449A (JP-H03-121449A), JP1993-61166A (JP-H05-61166A), JP1993-119449A (JP-H05-119449A), U.S. Pat. No. 4,814,262A, U.S. Pat. No. 4,980,275A, and the like.

In addition to these, in the pigment dispersion composition of the present invention, various organic fading inhibitors and metal complex-based fading inhibitors may be used as an additive. Furthermore, in the pigment dispersion composition of the present invention, conductive salts such as potassium thiocyanate, lithium nitrate, ammonium thiocyanate, and dimethylamine hydrochloride may be used for controlling ejection properties, and various polymer compounds such as an acrylic polymer, a polyvinyl butyral resin, a polyurethane resin, a polyamide resin, a polyester resin, an epoxy resin, a phenol resin, a polycarbonate resin, a polyvinyl formal resin, shellac, a vinyl-based resin, an acrylic resin, a rubber-based resin, waxes, and other natural resins may be used for adjusting the film properties. In addition, in the pigment dispersion composition of the present invention, for the purpose of adjusting the liquid properties, a nonionic surfactant, a cationic surfactant, an organic fluoro compound, and the like may be used.

In the pigment dispersion composition of the present invention, in addition to the above additives, if necessary, a leveling additive, a matting agent, waxes for adjusting the film properties, a tackifier not hindering polymerization that is for improving the adhesiveness with respect to a recording medium such as polyolefin or polyethylene terephthalate (PET), and the like may be used.

<Properties of Pigment Dispersion Composition>
(Viscosity)

The viscosity of the pigment dispersion composition of the present invention can be adjusted by the compositional ratio between the components constituting the pigment dispersion composition.

From the viewpoint of improving the dispersion efficiency in a step of dispersing the pigment, the viscosity of the pigment dispersion composition at 25° C. (room temperature) is preferably 20 mPa·s to 3,000 mPa·s, more preferably 20 mPa·s to 2,000 mPa·s, and even more preferably 50 mPa·s to 1,000 mPa·s.

In a case where the pigment dispersion composition of the present invention is used as an inkjet recording ink, considering the ejection stability, the viscosity of the pigment dispersion composition at the temperature at the time of ejection is preferably 2 mPa·s to 30 mPa·s, and more preferably 2 mPa·s to 20 mPa·s.

In a case where the pigment dispersion composition is used as an inkjet recording ink, the viscosity of the pigment dispersion composition at 25° C. (room temperature) is preferably 2 mPa·s to 200 mPa·s, more preferably 2 mPa·s to 100 mPa·s, even more preferably 2 mPa·s to 50 mPa·s, and particularly preferably 3 mPa·s to 50 mPa·s. If the viscosity of the pigment dispersion composition at room temperature is set to be high, even in a case where a porous recording medium is used, the permeation of the ink into the recording medium can be prevented, uncured monomers and the odor can be reduced, and dot bleeding at the time when the ink droplets land on the recording medium can be inhibited. As a result, the image quality improved. If the viscosity of the pigment dispersion composition at 25° C. is greater than 200 mPa·s, problems occur in the delivery of the pigment dispersion composition in some cases. Furthermore, if the viscosity of the ink composition at 25° C. is less than 2 mPa·s, mist occurs in some cases.

The viscosity described above refers to a value measured using an E-type viscometer (manufactured by TOKI SANGYO CO., LTD.)

(Surface Tension)

In a case where the pigment dispersion composition of the present invention is used as an inkjet recording ink, the surface tension of the pigment dispersion composition is preferably 20 mN/m to 40 mN/m, and more preferably 23 mN/m to 35 mN/m. In a case where recording is performed on various recording media such as polyolefin, PET, coated paper, and non-coated paper, the surface tension of the pigment dispersion composition is preferably equal to or greater than 20 mN/m from the viewpoint of bleeding and permeation and is preferably equal to or less than 35 mN/m from the viewpoint of wettability.

The surface tension described above refers to a value measured by a plate method using an Automatic Surface Tensiometer CBVP-Z (manufactured by Kyowa Interface Science Co., LTD.) under a temperature condition of 25° C.

[Inkjet Recording Method]

The inkjet recording method of the present invention uses the pigment dispersion composition of the present invention.

The inkjet recording method of the present invention preferably includes an ink application step of applying the pigment dispersion composition of the present invention onto a recording medium by an inkjet method. In a case where the pigment dispersion composition contains a polymerization initiator, the inkjet recording method of the present invention preferably further includes a curing step of curing the pigment dispersion composition by irradiating the applied pigment dispersion composition with actinic energy rays.

In the inkjet recording method of the present invention, from the viewpoint of realizing higher ejection stability, it is preferable that the pigment dispersion composition is ejected after being heated to 40° C. to 80° C. such that the viscosity of the pigment dispersion composition becomes 3 mPa·s to 30 mPa·s.

Generally, the viscosity of an nonaqueous ink composition is higher than that of an aqueous ink, and thus the viscosity of the nonaquaous ink composition greatly changes with the change of the temperature at the time of printing. The viscosity change of the pigment dispersion composition directly affects the size and the ejection speed of the ink droplets to a great extent, and this leads to the deterioration of the image quality. Therefore, the temperature of the pigment dispersion composition at the time of printing needs to be kept as constant as possible. The temperature of the pigment dispersion composition is preferably controlled within a range of set temperature±5° C., more preferably controlled within a range of set temperature±2° C., and even more preferably controlled within a range of set temperature±1° C.

One of the characteristics of the inkjet recording device used in the inkjet recording method is that the device includes means for stabilizing the temperature of the pigment dispersion composition. In this device, the piping system from an ink tank (intermediate tank in a case where the device includes it) to the ejection surface of the nozzle and all the members need to be kept at a constant temperature.

The temperature control method is not particularly limited. However, for example, it is preferable to provide a plurality of temperature sensors to the respective piping portions so as to control heating according to the flow rate of the pigment dispersion composition and the environmental temperature. Moreover, it is preferable that the head unit to be heated is thermally blocked or thermally insulated, such that the body of the device is not influenced by the temperature of external air. In order to shorten printer startup time taken for heating or to reduce thermal energy loss, it is preferable to insulate the heating unit from other sites and to reduce the thermal capacity of the entirety of the heating unit.

By containing a photopolymerization initiator as the polymerization initiator, the pigment dispersion composition of the present invention becomes an actinic ray-curable type pigment dispersion composition.

The irradiation conditions of the actinic rays in a case where the pigment dispersion composition of the present invention is the actinic ray-curable type pigment dispersion composition will be described below.

The basic irradiation method is disclosed in JP1985-132767A (JP-S60-132767A). Specifically, a light source is disposed on both sides of a head unit, and the head and the light source are scanned by a shuttle method. The irradiation is performed for a predetermined time after the ink lands on a recording medium. In addition, curing may be completed by using another light source that is not driven. Examples of the irradiation method include a method of using optical fiber and a method of irradiating a recording portion with reflected light by irradiating a mirror surface with collimated light (UV light). These irradiation methods can be used in the present invention.

In a case where the pigment dispersion composition of the present invention is used, the pigment dispersion composition is preferably heated at a constant temperature, and the time from landing to irradiation is preferably 0.01 seconds to 0.5 seconds, more preferably 0.01 seconds to 0.3 seconds, and even more preferably 0.01 seconds to 0.15 seconds. If the time from landing to irradiation is controlled to be within an extremely short time, it is possible to prevent the pigment dispersion composition having landed from bleeding before curing.

Furthermore, even if a porous recording medium is used, the pigment dispersion composition can be exposed to light before the composition permeates the recording medium into a deep portion that a light source does not reach. Therefore, unreacted monomers can be prevented from remaining, and hence the odor can be reduced.

If the aforementioned inkjet recording method is performed using the pigment dispersion composition of the present invention, even though various recording media whose surfaces have different wettability are used, a dot diameter of the pigment dispersion composition having landed can be kept constant, and thus the image quality is improved. Herein, in order to obtain a color image, it is preferable to sequentially stack the pigment dispersion compositions from color with low brightness. If pigment dispersion compositions with low brightness are stacked, it is difficult for the radiated actinic rays to reach the pigment dispersion composition in the lower portion. Accordingly, the curing sensitivity is easily reduced, the residual monomers easily increase, odor is easily caused, and the adhesiveness easily deteriorates. The exposure may be performed in a batch manner after compositions of all colors are ejected. However, from the viewpoint of accelerating curing, it is preferable to perform exposure for each color.

The inkjet recording device used in the inkjet recording method of the present invention is not particularly limited, and commercially available inkjet recording devices can be used.

According to the preferred ejection conditions described above, the pigment dispersion composition of the present invention are repeatedly heated and cooled. However, according to the pigment dispersion composition of the present invention, because the specific polymer functions as a pigment dispersing agent, even in a case where the pigment dispersion composition is stored in the aforementioned environment, the deterioration of dispersibility of the pigment is inhibited, excellent color developability is obtained over a long period of time, and the deterioration of the ejectability resulting from the aggregation of the pigment is also inhibited.

(Recording Medium)

The recording medium to which the pigment dispersion composition of the present invention can be applied is not particularly limited, and papers such as general non-coated paper and coated paper, various non-absorbent resin materials used for so-called soft packing, resin films obtained by shaping the various non-absorbent resin materials into films, and the like can be used. Examples of the resin films include a polyethylene terephthalate (PET) film, a biaxially oriented polystyrene (OPS) film, a biaxially oriented polypropylene (OPP) film, a biaxially oriented polyamide (ONY) film, a polyvinyl chloride (PVC) film, a polyethylene (PE) film, a triacetyl cellulose (TAC) film, and the like. In addition, examples of plastic usable as materials of recording media include polycarbonate, an acryl resin, an acrylonitrile/butadiene/styrene copolymer (ABS), polyacetal, polyvinyl alcohol (PVA), rubbers, and the like. Furthermore, metals or glasses can be used as recording media.

(Image Recorded Material)

The image recorded using the pigment dispersion composition of the present invention has excellent blocking resistance and exhibits excellent adhesiveness with respect to a recording medium. Therefore, an image recorded material having such an image can be widely used in various fields.

[Method for Producing Compound]

The method for producing a compound (hereinafter, referred to as a "specific polymer" as appropriate) of the present invention includes obtaining a polyalkylene oxide solution of poly(meth)acrylate by synthesizing poly(meth)acrylate having a structural unit represented by the following Formula (B) in polyalkylene oxide having a number average molecular weight of equal to or greater than 300 and less than 5,000 and having a structural unit represented by the following Formula (C) (hereinafter, referred to as a "step I" as appropriate), and mixing the obtained polyalkylene oxide solution of poly(meth)acrylate, a compound having a structural unit represented by the following Formula (A), a compound having a structural unit represented by the following Formula (D), and a radically polymerizable compound to react therewith (hereinafter, referred to as a "step II" as appropriate). In this method, a mass ratio [(B)/(C)] of the poly(meth)acrylate having the structural unit represented by Formula (B) to the polyalkylene oxide having the structural unit represented by Formula (C) is 20/80 to 60/40, and a value obtained by dividing the total number of moles of the compound having the structural unit represented by Formula (A), the poly(meth)acrylate having the structural unit represented by Formula (B), and the polyalkylene oxide having the structural unit represented by Formula (C) by the number of moles of the compound having the structural unit represented by Formula (D) is 1.0 to 1.25.

In the curable composition such as the pigment dispersion composition of the present invention, the organic solvent causes the deterioration of curability, the plasticization of the cured film, the blocking, and the like. Therefore, it is desirable that the pigment dispersion composition does not contain the organic solvent that becomes a non-curable component as far as possible. Without a solvent, it is difficult to synthesize polyurethane having excellent blocking resistance and high glass transition temperature. In contrast, if polyurethane is synthesized in an organic solvent, a step of distilling away the organic solvent by heating or by pressure reduction needs to be additionally performed.

According to the production method of the present invention, the pigment as a coloring component of the pigment dispersion composition can be excellently and stably dispersed, and a compound which makes it possible to form a cured film having excellent blocking resistance and adhesiveness can be produced without a solvent (without using an organic solvent).

Hereinafter, the "compound having the structural unit represented by Formula (A)" is described as a "compound having the structural unit (A)" as appropriate; the "poly(meth)acrylate having the structural unit represented by Formula (B)" is described as "poly(meth)acrylate having a structural unit (B)"; the "polyalkylene oxide having the structural unit represented by Formula (C) having a number average molecular weight of equal to or greater than 300 and less than 5,000" is described as "polyalkylene oxide having the structural unit (C)"; and the "compound having the structural unit represented by Formula (D)" is described as a "compound having the structural unit (D)".

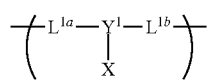

Formula (A)

In Formula (A), each of $L^{1a}$ and $L^{1b}$ independently represents —O— or —NR—; R represents a hydrogen atom or an alkyl group having 1 to 4 carbon atoms; X represents a tertiary amino group or a carboxy group; and $Y^1$ represents a trivalent linking group.

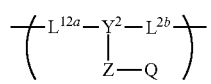

Formula (B)

In Formula (B), each of $L^{2a}$ and $L^{2b}$ independently represents —O— or —NH—; Q represents a group derived from poly(meth)acrylate having a glass transition temperature of equal to or higher than 50° C.; $Y^2$ represents a trivalent linking group; and Z represents a divalent linking group bonded to $Y^2$ and Q.

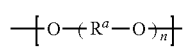

Formula (C)

In Formula (C), $R^a$ represents a linear or branched alkylene group having 2 to 4 carbon atoms, and n is the average addition number of moles of alkylene oxide and represents a number of 6 to 115.

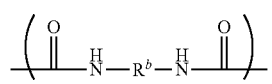

Formula (D)

In Formula (D), $R^b$ represents an alkylene group having 6 to 15 carbon atoms, an arylene group, a divalent linking group in which an arylene group is bonded to an arylene group, or a divalent linking group in which an alkylene group is bonded to an arylene group.

Because the details of Formulae (A), (B), (C), and (D) are the same as described above, they will not be repeated herein.

The method for producing a specific polymer of the present invention includes a step I of obtaining a polyalkylene oxide solution of poly(meth)acrylate by synthesizing poly(meth)acrylate having the structural unit (B) in polyalkylene oxide having the structural unit (C), and a step II of mixing the obtained polyalkylene oxide solution of poly(meth)acrylate, the compound having the structural unit (A), the compound having the structural unit (D), and the radically polymerizable compound to react therewith.

Hereinafter, the steps I and II will be described.

[Step I]

The step I is a step of obtaining a polyalkylene oxide solution of poly(meth)acrylate by synthesizing poly(meth)acrylate having the structural unit (B) in polyalkylene oxide having the structural unit (C).

In the method for producing a specific polymer of the present invention, the polyalkylene oxide having the structural unit (C), that is, the polyalkylene oxide represented by Formula (C) having a number average molecular weight of equal to or greater than 300 and less than 5,000 functions as a solvent excellently dissolving the poly(meth)acrylate having the structural unit (B) with a glass transition temperature of equal to or higher than 50° C. Therefore, in the step I, even if the polyalkylene oxide does not contain an organic solvent, poly(meth)acrylate having the structural unit (B) with relatively high Tg can be obtained by polymerization.

Furthermore, the polyalkylene oxide having the structural unit (C) is introduced into the specific polymer having the structural unit (B). Therefore, even in a case where a cured film is formed by using the specific polymer obtained by the production method of the present invention as a dispersing agent, the deterioration of curability, the plasticization of the cured film, the blocking, and the like do not easily occur.

Examples of the poly(meth)acrylate having the structural unit (B) include polymethyl methacrylate (PMMA-OH2) having two hydroxyl groups on the terminal, poly(methyl methacrylate/n-butyl methacrylate) (PMMA/PBMA-OH2) having two hydroxyl groups on the terminal, poly(tert-butyl methacrylate) (PtBMA-OH2) having two hydroxyl groups on the terminal, polycyclohexyl methacrylate (PCyHMA-OH2) having two hydroxyl groups on the terminal, poly (cyclohexyl methacrylate/2-phenoxyethyl methacrylate) (PCyHMA/PEMA-OH2) having two hydroxyl groups on the terminal, and the like. Among these, from the viewpoint of the affinity with a medium, PMMA-OH2 is preferable.

Examples of the polyalkylene oxide having the structural unit (C) include diol-type polypropylene glycol (PPG400, number average molecular weight: 400), diol-type polyethylene glycol, a diol-type polyethylene glycol-polypropylene glycol copolymer, and the like. Among these, from the viewpoint of the affinity with a medium or handling, polypropylene glycol such as PPG400 is preferable.

The mass ratio [(B)/(C)] of the poly(meth)acrylate having the structural unit (B) to the polyalkylene oxide having the structural unit (C) is 20/80 to 60/40 and preferably 30/70 to 60/40.

If the mass ratio of the poly(meth)acrylate having the structural unit (B) to the polyalkylene oxide having the structural unit (C) is within the above range, the poly(meth)acrylate having the structural unit (B) can be polymerized in the polyalkylene oxide having the structural unit (C).

If the ratio of the poly(meth)acrylate having the structural unit (B) is equal to or less than the upper limit of the above range, the increase in the viscosity can be inhibited, and thus stirring can be performed. Accordingly, dilution operation such as the addition of a solvent is not required, and this is preferable because a step of removing a solvent for producing the specific polymer is not required.

If the ratio of the poly(meth)acrylate having the structural unit (B) is equal to or greater than the lower limit of the above range, the polymerization reaction can be carried on. Furthermore, the dispersion stability of the pigment resulting from the obtained specific polymer is improved.

The solution of the "polyalkylene oxide having the structural unit (C)" of the "poly(meth)acrylate having the structural unit (B)" (polyalkylene oxide solution of poly(meth) acrylate) can be synthesized by, for example, polymerizing the corresponding (meth)acrylate compound in the polyalkylene oxide having the structural unit (C) by using a known radical polymerization initiator in the presence of a chain transfer agent having two hydroxyl groups such as thioglycerol. At this time, the (meth)acrylate, the polyalkylene oxide, the chain transfer agent, and the polymerization initiator may be added simultaneously. Alternatively, the (meth)acrylate, the chain transfer agent, and the polymerization initiator may be slowly added dropwise to a small amount of polyalkylene oxide. The method of dropwise adding the (meth)acrylate and the chain transfer agent is preferable because this method homogenizes the composition of the generated polymer and improves the production stability.

[Step II]

The step II is a step of mixing the polyalkylene oxide solution of the poly(meth)acrylate obtained by the above step I with the compound having the structural unit (A), the compound having the structural unit (D), and the radical polymerization initiator to react.

The specific polymer produced by the production method of the present invention uses, as a reaction solvent, the polyalkylene oxide having the structural unit (C) in the step I and a radically polymerizable compound in the step II. Therefore, even if a special step of removing the non-curable organic solvent is not performed, the specific polymer not containing the non-curable organic solvent can be produced. Consequently, the pigment dispersion composition using the specific polymer produced by the production method of the present invention as a dispersing agent exhibits high sensitivity to the actinic energy rays radiated thereto. As a result, in a case where the pigment dispersion composition is used as an inkjet recording ink, even if the printed matters are stored in a stacked state, it is possible to inhibit the so-called blocking phenomenon in which a printing surface of a printed matter adheres to a printing surface or a non-printing surface of another printed matter.

As the radically polymerizable compound, for example, it is possible to use various known radically polymerizable monomers that cause a polymerization reaction by an initiation species generated from a photo-radical initiator.

Examples of the radically polymerizable monomers include (meth)acrylates, (meth)acrylamides, vinyl ethers, aromatic vinyls, and the like.

Examples of the (meth)acrylates used as the radically polymerizable monomers include monofunctional (meth) acrylate, bifunctional (meth)acrylate, trifunctional (meth) acrylate, tetrafunctional (meth)acrylate, pentafunctional (meth)acrylate, hexafunctional (meth)acrylate, and the like. Here, these monomers should not contain a hydroxyl group and functional groups such as primary and secondary amino groups that react with isocyanate.

Specific examples thereof include N-vinylcaprolactam (NVC), isobornyl acrylate (IBOA), 2-phenoxyethyl acrylate (PEA), ethoxydiethylene glycol acrylate (EOEOEA), dipropylene glycol diacrylate (DPGDA), trimethylolpropane triacrylate (TMPTA), acrylate, propoxylated neopentyl glycol diacrylate, hexanediol diacrylate, and the like.

Examples of the compound having the structural unit (A) include compounds providing the structural units described above as specific examples of the structural unit (A), such as 3-dimethylamino-1,2-propanediol and 2,2-bis(hydroxymethyl)propionate. Among these, 3-dimethylamino-1,2-propanediol is preferable.

Examples of the compound having the structural unit (D) include organic polyisocyanate. As the organic polyisocyanate, any of organic polyisocyanates known in the related art can be used, and examples thereof include aromatic diisocyanate such as 2,6-tolylene diisocyanate (TDI) and 1,4-xylylene diisocyanate (XDI). A prepolymer type, a nurate type, a urea type, and a carbodiimide type modified compounds of the aforementioned diisocyanates are also preferable. Two or more kinds of the isocyanate compounds or two or more kinds of the modified compounds thereof can be used by being mixed together.

In the step II, the compound having the structural unit (A) and the compound having the structural unit (D) may be reacted with a compound having a structural unit represented by the following Formula (E) (hereinafter, referred to as a "polycyclic aromatic compound having a structural unit (E)" as appropriate) in a radically polymerizable compound.

  Formula (E)

In Formula (E), each of $L^{3a}$ and $L^{3b}$ independently represents —O— or —NR—; R represents a hydrogen atom or an alkyl group having 1 to 4 carbon atoms; and $Y^3$ represents a divalent polycyclic aromatic hydrocarbon group bonded to $L^{3a}$ and $L^{3b}$.

Because the details of Formula (E) are the same as described above, they will not be repeated herein.

Examples of the polycyclic aromatic compound having the structural unit (E) include compounds providing the structural units described above as specific examples of the structural unit (E). Among these, from the viewpoint of the adsorptivity with respect to a pigment, 1,9-dihydroxyanthraquinone is preferable.

In the production method of the present invention, a value obtained by dividing the total number of moles of the compound having the structural unit (A), the poly(meth) acrylate having the structural unit (B), and the polyalkylene oxide having the structural unit (C) by the number of moles of the compound having the structural unit (D) is 1.0 to 1.25. The value is preferably 1.05 to 1.25, and more preferably 1.07 to 1.21.

In a case where the polycyclic aromatic compound having the structural unit (E) is used, a value obtained by dividing the total number of moles of the compound having the structural unit (A), the poly(meth)acrylate having the structural unit (B), the polyalkylene oxide having the structural unit (C), and the polycyclic aromatic compound having the structural unit (E) by the number of moles of the compound having the structural unit (D) is preferably 1.0 to 1.25, and more preferably 1.05 to 1.21.

In the steps I and II, various additives such as a polymerization initiator, a polymerization inhibitor, and a polymerization catalyst may be used. Because the details of the polymerization initiator, the polymerization inhibitor, and the like are the same as described above, they will not be repeated here.

EXAMPLES

Hereinafter, the present invention will be more specifically described based on examples. However, as long as the gist of the present invention is maintained, the present invention is not limited to the following examples.

In the present examples, the "compound having the structural unit represented by Formula (A)" is described as a "compound A"; the "poly(meth)acrylate having the structural unit represented by Formula (B)" is described as a "compound B"; the "polyalkylene oxide having a number average molecular weight of equal to or greater than 300 and less than 5,000 and having a structural unit represented by Formula (C)" is described as a "compound C"; and the "compound having the structural unit represented by Formula (D)" is described as a "compound D".

The molecular weight of polymers (specific polymers and comparative polymers) was indicated as a weight average molecular weight (Mw) and measured by GPC (HPLC LC-10AD manufactured by Shimadzu Corporation). In the GPC measurement, by using Shodex GPC-KF-804 manufactured by SHOWA DENKO K.K. as a column and tetrahydrofuran (THF) as an eluant, the weight average molecular weight was measured at a column temperature of 40° C. and a flow rate of 0.8 mL/sec. Furthermore, the weight average molecular weight was calculated through the comparison with standard polystyrene.

Synthesis of Polymer

Synthesis Example 1

8.0 g of PPG400 (polypropylene glycol diol type, molecular weight: 400, manufactured by Wako Pure Chemical Industries, Ltd.) was put into a 200 mL three-neck flask made of PTFE equipped with a stirring blade and heated to 80° C. while being stirred. Thereafter, a solution mixture of 20.0 g of PPG400, 29.7 g of methyl methacrylate (manufactured by Wako Pure Chemical Industries, Ltd.), 0.32 g of 3-mercapto-1,3-propanediol (manufactured by Wako Pure Chemical Industries, Ltd.), and 0.025 g of 2,2'-azobis(2-methyl-N-(2-hydroxyethyl)propionamide) (manufactured by Wako Pure Chemical Industries, Ltd.) was added dropwise thereto for 2 hours in a nitrogen gas stream. The resultant solution was reacted as it was for 1 hour, and then 0.025 g (total amount added: 0.05 g) of 2,2'-azobis(2-methyl-N-(2-hydroxyethyl)propionamide (manufactured by Wako Pure Chemical Industries, Ltd.) was added thereto twice every two hours. The resultant solution was heated for 2 hours at 90° C., thereby obtaining a PPG solution of PMMA-OH2 [polymethyl methacrylate having two hydroxyl groups on the terminal, number average molecular weight: 10,000].

The number average molecular weight of PMMA-OH2 was measured by GPC. The measurement conditions of GPC were the same as the measurement conditions at the time of measuring the weight average molecular weight of the polymer. To the obtained PPG solution of PMMA-OH2, 10 g of 3-dimethylamino-1,2-propanediol (DMAPD, manufactured by Tokyo Chemical Industry Co., Ltd.), 229.8 g of 2-phenoxyethyl acrylate (PEA, manufactured by Tokyo Chemical Industry Co., Ltd.), 0.1 g of 2,2,6,6-tetramethylpiperidin-1-oxyl free radical, and 0.1 g of NEOSTANN U-600 (trade name, bismuth-based catalyst, manufactured by Tokyo Chemical Industry Co., Ltd.) were added, and the resultant solution was heated for 30 minutes at 75° C. Then, 32.0 g of tolylene diisocyanate (TDI, isomer mixture, manufactured by Tokyo Chemical Industry Co., Ltd.) was added thereto, and the resultant solution was stirred for 6 hours, thereby obtaining a 30% by mass PEA solution of a specific polymer 1.

Synthesis Example 2

Specific polymers 2 to 8, comparative polymers 1 to 3 and 6 were synthesized by changing the reagents used in a synthesis of the specific polymer 1 to those described in Table and by appropriately adjusting the amount of 3-mercapto-1,3-propanediol or 2,2'-azobis(2-methyl-N-(2-hydroxyethyl)propionamide) and the reaction time.

Synthesis Example 3

In a case where the same method as in Synthesis example 1 was used in a synthesis of comparative polymers 4 and 5, the polymer solution was solidified in synthesizing a compound B. Therefore, the comparative polymers 4 and 5 were synthesized by adding 50 g of methyl ethyl ketone at the time of polymerizing methyl methacrylate or n-butyl methacrylate. Furthermore, if methyl ethyl ketone as an organic solvent is mixed in, the curability deteriorates. Accordingly, after a polyurethanation step using a compound D, methyl ethyl ketone was removed using a rotary evaporator, and then the polymers were used.

The compositions of the obtained specific polymers 1 to 8 and comparative polymers 1 to 6 are summarized in the following Table 1.

TABLE 1

| | (a) Amino group/ Carboxy group diol | | (b) Poly(meth)acrylate | | | (c) Polyalkylene oxide | |
|---|---|---|---|---|---|---|---|
| | Monomer name | Used amount (g) | Name | Tg (° C.) | Used amount (g) | Name | Used amount (g) |
| Specific polymer 1 | DMAPD | 10 | PMMA-OH2 | 102 | 30 | PPG400 | 28 |
| Specific polymer 2 | DMAPD | 11.3 | PMMA-OH2 | 102 | 33.9 | PPG400 | 22.9 |
| Specific polymer 3 | DMAPD | 4.5 | PMMA-OH2 | 102 | 18.2 | PPG400 | 45.5 |

TABLE 1-continued

| | | | | | | | |
|---|---|---|---|---|---|---|---|
| Specific polymer 4 | DMAPD | 10 | PMMA-OH2 | 102 | 26 | PPG400 | 25 |
| Specific polymer 5 | DMAPD | 5.6 | PBMA/PMMA-OH2 | 54 | 33.3 | PPG400 | 33.3 |
| Specific polymer 6 | DMAPD | 4.2 | PMMA-OH2 | 102 | 33.9 | PPG400 | 33.9 |
| Specific polymer 7 | BHMPA | 10 | PMMA-OH2 | 102 | 30 | PPG400 | 28 |
| Specific polymer 8 | DMAPD | 11.5 | PMMA-OH2 | 102 | 34.5 | PEG4000 | 32.2 |
| Comparative polymer 1 | — | — | PMMA-OH2 | 102 | 39.4 | PPG400 | 39.4 |
| Comparative polymer 2 | DMAPD | 4.8 | PBA-OH2 | −55 | 33.3 | PPG400 | 33.3 |
| Comparative polymer 3 | DMAPD | 9.3 | PMMA-OH2 | 102 | 9.3 | PPG400 | 42.1 |
| Comparative polymer 4 | DMAPD | 5 | PMMA-OH2 | 102 | 50 | PPG400 | 25 |
| Comparative polymer 5 | DMAPD | 4.6 | PBMA-OH2 | 18 | 45.7 | PPG400 | 27.4 |
| Comparative polymer 6 | DMAPD | 6.8 | PBMA/PMMA-OH2 | 54 | 40.3 | PEG20000 | 40.3 |

| | (d) Diisocyanate | | (e) Polycyclic aromatic compound | | (b)/(c) Mass ratio | (a) + (b) + (c) + (e)/(d) Molar ratio | Mw |
|---|---|---|---|---|---|---|---|
| | Name | Used amount (g) | Name | Used amount (g) | | | |
| Specific polymer 1 | TDI | 32 | — | — | 1.07 | 1.17 | 30,200 |
| Specific polymer 2 | TDI | 31.8 | — | — | 1.48 | 1.17 | 58,200 |
| Specific polymer 3 | TDI | 31.8 | — | — | 0.40 | 1.19 | 30,200 |
| Specific polymer 4 | TDI | 34 | 1,9-dihydroxyanthraquinone | 5 | 1.04 | 1.15 | 120,000 |
| Specific polymer 5 | TDI | 27.8 | — | — | 1.00 | 1.18 | 60,000 |
| Specific polymer 6 | XDI | 28 | — | — | 1.00 | 1.21 | 35,000 |
| Specific polymer 7 | TDI | 27.5 | — | — | 1.07 | 1.07 | 70,000 |
| Specific polymer 8 | TDI | 21.8 | — | — | 1.07 | 1.16 | 30,200 |
| Comparative polymer 1 | TDI | 21.3 | — | — | 1.00 | 1.19 | 32,000 |
| Comparative polymer 2 | TDI | 28.6 | — | — | 1.00 | 1.18 | 42,000 |
| Comparative polymer 3 | TDI | 39.3 | — | — | 0.22 | 1.13 | 58,203 |
| Comparative polymer 4 | TDI | 22.5 | — | — | 2.00 | 1.18 | 64,000 |
| Comparative polymer 5 | TDI | 22.4 | — | — | 1.67 | 1.11 | 30,000 |
| Comparative polymer 6 | TDI | 12.7 | — | — | 1.00 | 1.11 | 150,000 |

In Table 1, "BHMPA" indicates "2,2-bis(hydroxymethyl) propionate".

Furthermore, in Table 1, "PEG4000" is "polyethylene glycol (Mn: 4,000, manufactured by Wako Pure Chemical Industries, Ltd.)", and "PEG20000" is "polyethylene glycol (Mn: 20,000, manufactured by Wako Pure Chemical Industries, Ltd.)".

"PMMA-OH2", "PBMA/PMMA-OH2", "PBA-OH2", and "PBMA-OH2" in Table 1 are compounds represented by the following formulae. In addition, "XDI" is TAKENATE XDI (xylylene diisocyanate, manufactured by Mitsui Chemicals, Inc.).

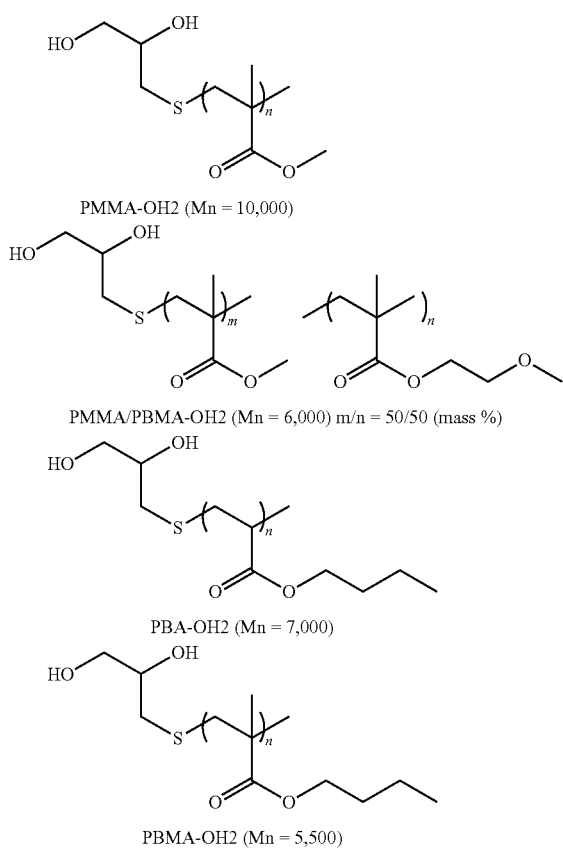

Preparation of Yellow Mill Base (Mill Bases 1 to 7 and Mill Bases 9 to 15)

Synthesis Example 4

20 parts by mass of a yellow pigment [NOVOPERM YELLOW H2G (PY120), manufactured by Clariant], 46.7 parts by mass of phenoxyethyl acrylate (PEA), and 33.3 parts by mass of the specific polymer 1 were stirred and mixed together, thereby obtaining a premix. The obtained premix was put into a disperser (motor mill M50, manufactured by EIGER TORRANCE LIMITED) and dispersed for 2 hours at a rotation speed of 7 m/s by using zirconia beads having a diameter of 0.65 mm, thereby obtaining a mill base 1.

According to the combination of a mill base and a polymer shown in Table 2, mill bases 2 to 5 and 9 to 15 were obtained by the same operation as described above.

A mill base 6 was obtained by the same operation as described above, except that 13.3 parts by mass of phenoxyethyl acrylate and 86.7 parts by mass of the specific polymer 6 were used.

A mill base 7 was obtained by the same operation as described above, except that 60 parts by mass of phenoxyethyl acrylate and 20 parts by mass of the specific polymer 6 were used.

Preparation of White Mill Base (Mill Base 8)

Synthesis Example 5

50 parts by mass of a white pigment [CR-60-2 (titanium oxide pigment, manufactured by ISHIHARA SANGYO KAISHA, LTD.)], 16.7 parts by mass of phenoxyethyl acrylate, and 33.3 parts by mass of the specific polymer 7 were stirred and mixed together, thereby obtaining a premix. The obtained premix was put into a disperser (motor mill M50, manufactured by EIGER TORRANCE LIMITED) and dispersed for 1 hour at a rotation speed of 7 m/s by using zirconia beads having a diameter of 0.65 mm, thereby obtaining a mill base 8.

A mill base 16 was obtained in the same manner as described above, except that the specific polymer 8 was changed to the comparative polymer 1.

Preparation of Inkjet Ink

Examples 1 to 10 and Comparative Examples 1 to 7

According to the composition shown in Table 2 (unit of the numerical value in the table: % by mass), a polymerizable compound, a polymerization initiator, and a polymerization initiator were added to the mill base and mixed together. Then, the obtained mixture filtered through a membrane filter under pressure, thereby obtaining inkjet inks of Examples 1 to 10 and Comparative examples 1 to 7.

The abbreviation, the chemical name, the manufacturer, and the like of the components used for preparing the inks are as below.

(Polymerizable Compound)

NVC: N-vinylcaprolactam (manufactured by BASF Corporation) IBOA: isobornyl acrylate (trade name: IBXA, manufactured by OSAKA ORGANIC CHEMICAL INDUSTRY LTD.)

PEA: 2-phenoxyethyl acrylate (trade name: SR339, manufactured by Sartomer) EOEOEA: ethoxydiethylene glycol acrylate (trade name: light acrylate EC-A, manufactured by KYOEISHA CHEMICAL Co., LTD.)

DPGDA: dipropylene glycol diacrylate (manufactured by SHIN-NAKAMURA CHEMICAL CO., LTD.)

TMPTA: trimethylolpropane triacrylate (manufactured by SHIN-NAKAMURA CHEMICAL CO., LTD.)

(Polymerization Initiator)

IRGACURE 369: (manufactured by Ciba Specialty Chemicals Corporation)

IRGACURE 819: (manufactured by Ciba Specialty Chemicals Corporation)

(Polymerization Inhibitor)

TEMPO-OH: 4-hydroxy-2,2, 6, 6-tetramethylpiperidin-1-oxyl free radical (manufactured by Tokyo Chemical Industry Co., Ltd.)

Evaluation of Inkjet Ink

According to the following evaluation method, the obtained inkjet inks were evaluated. The results are shown in Table 2.

1. Viscosity

The viscosity of each of the inkjet inks at 25° C. was measured using an E-type viscometer (manufactured by TOKI SANGYO CO., LTD.). As a result, it was confirmed that all of the inkjet inks has viscosity of less than 30 mPa·s and can be ejected.

2. Storage Stability

Each of the inkjet inks was stored for 2 months at 25° C. and then stored for 2 weeks at 60° C. Thereafter, the dispersed state was evaluated by the viscosity thereof. The evaluation criteria are as below.

Herein, the viscosity was measured by the same method as described above.

Those categorized into A and B by the evaluation are acceptable for practical use.

Evaluation Criteria

A: The viscosity increase was less than 5%, and the ink was at a level unproblematic in terms of ejection stability.

B: The viscosity increase was equal to or greater than 5% and less than 10%, and the ink was at a level unproblematic in terms of ejection stability.

C: The viscosity increase was equal to or greater than 10% and less than 20%, and the ink was at a level at which ejection stability deteriorates.

D: The viscosity increase was equal to or greater than 20%, and the ink was at a level at which ejection stability markedly deteriorates.

3. Blocking Resistance

By using a piezoelectric inkjet head (CA3 head, manufactured by TOSHIBA TEC CORPORATION, printing density: 300 dpi, ejection frequency: 4 kHz, nozzle number: 64), each of the inkjet inks was solid-printed on a vinyl chloride film such that a thickness of a cured film (image portion) became 12 Thereafter, by using a Deep UV lamp (SP-7 manufactured by USHIO INC.), exposure was performed under a condition of an irradiation energy of 300 mJ/cm$^2$, thereby obtaining printing samples (printed matters).

Two sheets of the obtained printed matters were stacked on each other such that the surfaces thereof having the curing film faced each other (such that the printing surfaces faced each other). Furthermore, by using an iron plate having the same size as the printed matter, the printed matters were pressed for 1 hour at 30° C. at a pressure of 1 kg/cm$^2$. Thereafter, the state in a case of peeling off the surfaces of the two sheets of coating films was visually observed and evaluated according the following evaluation criteria.

Those categorized into A and B by the evaluation are acceptable for practical use.

Evaluation Criteria

A: Peeling did not occur in the coating film, and no sound was made at the time of peeling.

B: Peeling did not occur in the coating film, but sound was made at the time of peeling.

C: Although peeling did not occur in the coating film, slight transfer was observed in the coating film.

D: Peeling occurred in the coating film.

4. Adhesiveness

As a method for evaluating adhesiveness with respect to a polyethylene terephthalate substrate, a cross hatch test (JIS K5600-5-6, 2004) was performed. According to the inkjet recording method performed in the test for evaluating 3. Blocking resistance, a solid image in which an image portion has an average film thickness of 12 μm was drawn. Thereafter, for each of the printed matters, the cross hatch test was performed. Herein, according to JIS K5600-5-6 (2004), the adhesiveness was evaluated into 6 levels on a scale of 0 to 5 based on the following criteria. Herein, level 0 means that the cut edge is perfectly smooth, and none of grids is peeled off.

Those categorized into A and B by the evaluation are acceptable for practical use.

Evaluation Criteria

A: Evaluated into level 0 or 1 according to JIS K5600-5-6
B: Evaluated into level 2 or 3 according to JIS K5600-5-6
C: Evaluated into level 4 or 5 according to JIS K5600-5-6

5. Ejection Stability

Each of the inkjet inks was stored for 2 weeks at 25° C. Thereafter, by using the inkjet recording device used for the test for evaluating "3. Blocking resistance", recording was performed on a recording medium. Whether or not dot missing or ink scattering occurred when printing was continuously performed for 3 hours at 25° C. was visually observed, and the ejection stability was evaluated according to the following evaluation criteria.

Those categorized into A and B by the evaluation are acceptable for practical use.

Evaluation Criteria

A: Dot missing or ink scattering did not occur.
B: Dot missing or ink scattering occurred 1 to 4 times.
C: Dot missing or ink scattering occurred 5 times or more.

TABLE 2

|  |  | Example 1 | Example 2 | Example 3 | Example 4 | Example 5 | Example 6 | Example 7 | Example 8 |
|---|---|---|---|---|---|---|---|---|---|
| Polymerizable | NVC | 20 | 20 | 20 | 20 | 20 | 20 | 20 | 20 |
| compound | IBOA | 10 | 10 | 10 | 10 | 10 | 10 | 10 | 10 |

TABLE 2-continued

| | | | | | | | | | |
|---|---|---|---|---|---|---|---|---|---|
| | PEA | 30 | 30 | 30 | 30 | 30 | 30 | 30 | 30 |
| | EOEOEA | 4.8 | 4.8 | 4.8 | 4.8 | 4.8 | 4.8 | 4.8 | 4.8 |
| | DPGDA | 15 | 15 | 15 | 15 | 15 | 15 | 11 | 15 |
| | TMPTA | | | | | | | 2 | |
| Photo-polymerization initiator | IRGACURE 369 | 2 | 2 | 2 | 2 | 2 | 2 | 2 | 2 |
| | IRGACURE 819 | 8 | 8 | 8 | 8 | 8 | 8 | 8 | 8 |
| Mill base | Mill base 1 | 10 | | | | | | 12 | |
| | Mill base 2 | | 10 | | | | | | |
| | Mill base 3 | | | 10 | | | | | |
| | Mill base 4 | | | | 10 | | | | |
| | Mill base 5 | | | | | 10 | | | |
| | Mill base 6 | | | | | | 10 | | |
| | Mill base 7 | | | | | | | | 10 |
| | Mill base 8 | | | | | | | | |
| | Mill base 9 | | | | | | | | |
| | Mill base 10 | | | | | | | | |
| | Mill base 11 | | | | | | | | |
| | Mill base 12 | | | | | | | | |
| | Mill base 13 | | | | | | | | |
| | Mill base 14 | | | | | | | | |
| | Mill base 15 | | | | | | | | |
| | Mill base 16 | | | | | | | | |
| Pigment | (Amount of Y pigment in mill base) | 2 | 2 | 2 | 2 | 2 | 2 | 2.4 | 2 |
| | (Amount of W pigment in mill base) | | | | | | | | |
| Polymer | (Specific polymer 1) | 1 | | | | | | 1.2 | |
| | (Specific polymer 2) | | 1 | | | | | | 0.6 |
| | (Specific polymer 3) | | | 1 | | | | | |
| | (Specific polymer 4) | | | | 1 | | | | |
| | (Specific polymer 5) | | | | | 1 | | | |
| | (Specific polymer 6) | | | | | | 2 | | |
| | (Specific polymer 7) | | | | | | | | |
| | (Specific polymer 8) | | | | | | | | |
| | (Comparative polymer 1) | | | | | | | | |
| | (Comparative polymer 2) | | | | | | | | |
| | (Comparative polymer 3) | | | | | | | | |
| | (Comparative polymer 4) | | | | | | | | |
| | (Comparative polymer 5) | | | | | | | | |
| | (Comparative polymer 6) | | | | | | | | |
| Monomer | (PEA in mill base) | 7 | 7 | 7 | 7 | 7 | 6 | 8.4 | 7.4 |
| Polymerization inhibitor | TEMPO-OH | 0.2 | 0.2 | 0.2 | 0.2 | 0.2 | 0.2 | 0.2 | 0.2 |
| Evaluation item | Blocking resistance | A | B | A | A | A | B | A | B |
| | Adhesiveness | A | A | A | A | A | A | A | B |
| | Storage stability | A | A | A | A | A | A | A | B |
| | Ejection stability | A | A | B | A | A | B | B | A |
| | Whether or not purification step is performed by production | Not performed | Not performed | Not performed | Not performed | Not performed | Not performed | Not performed | Not performed |

TABLE 2-continued

|  |  | Example 9 | Example 10 | Comparative example 1 | Comparative example 2 | Comparative example 3 |
|---|---|---|---|---|---|---|
| Polymerizable compound | NVC | 10 | 20 | 20 | 20 | 20 |
|  | IBOA | 10 | 10 | 10 | 10 | 10 |
|  | PEA | 13.8 | 30 | 30 | 30 | 30 |
|  | EOEOEA |  | 4.8 | 4.8 | 4.8 | 4.8 |
|  | DPGDA | 30 | 15 | 15 | 15 | 15 |
|  | TMPTA |  |  |  |  |  |
| Photo-polymerization initiator | IRGACURE 369 | 2 | 2 | 2 | 2 | 2 |
|  | IRGACURE 819 | 8 | 8 | 8 | 8 | 8 |
| Mill base | Mill base 1 |  |  |  |  |  |
|  | Mill base 2 |  |  |  |  |  |
|  | Mill base 3 |  |  |  |  |  |
|  | Mill base 4 |  |  |  |  |  |
|  | Mill base 5 |  |  |  |  |  |
|  | Mill base 6 |  |  |  |  |  |
|  | Mill base 7 |  |  |  |  |  |
|  | Mill base 8 | 26 |  |  |  |  |
|  | Mill base 9 |  | 10 |  |  |  |
|  | Mill base 10 |  |  | 10 |  |  |
|  | Mill base 11 |  |  |  | 10 |  |
|  | Mill base 12 |  |  |  |  | 10 |
|  | Mill base 13 |  |  |  |  |  |
|  | Mill base 14 |  |  |  |  |  |
|  | Mill base 15 |  |  |  |  |  |
|  | Mill base 16 |  |  |  |  |  |
| Pigment | (Amount of Y pigment in mill base) |  | 2 | 2 | 2 | 2 |
|  | (Amount of W pigment in mill base) | 13 |  |  |  |  |
| Polymer | (Specific polymer 1) |  |  |  |  |  |
|  | (Specific polymer 2) |  |  |  |  |  |
|  | (Specific polymer 3) |  |  |  |  |  |
|  | (Specific polymer 4) |  |  |  |  |  |
|  | (Specific polymer 5) |  |  |  |  |  |
|  | (Specific polymer 6) |  |  |  |  |  |
|  | (Specific polymer 7) | 2.6 |  |  |  |  |
|  | (Specific polymer 8) |  | 1 |  |  |  |
|  | (Comparative polymer 1) |  |  | 1 |  |  |
|  | (Comparative polymer 2) |  |  |  | 1 |  |
|  | (Comparative polymer 3) |  |  |  |  | 1 |
|  | (Comparative polymer 4) |  |  |  |  |  |
|  | (Comparative polymer 5) |  |  |  |  |  |
|  | (Comparative polymer 6) |  |  |  |  |  |
| Monomer | (PEA in mill base) | 10.4 | 8 | 7 | 7 | 7 |
| Polymerization inhibitor | TEMPO-OH | 0.2 | 0.2 | 0.2 | 0.2 | 0.2 |

TABLE 2-continued

| Evaluation item | | | | | | |
|---|---|---|---|---|---|---|
| | Blocking resistance | A | B | C | C | C |
| | Adhesiveness | A | B | C | C | B |
| | Storage stability | B | B | C | A | B |
| | Ejection stability | A | A | C | A | A |
| | Whether or not purification step is performed by production | Not performed | Not performed | Not performed | Not performed | Not performed |

| | | Comparative example 4 | Comparative example 5 | Comparative example 6 | Comparative example 7 |
|---|---|---|---|---|---|
| Polymerizable compound | NVC | 20 | 20 | 20 | 10 |
| | IBOA | 10 | 10 | 10 | 10 |
| | PEA | 30 | 30 | 30 | 13.8 |
| | EOEOEA | 4.8 | 4.8 | 4.8 | |
| | DPGDA | 15 | 15 | 15 | 30 |
| | TMPTA | | | | |
| Photo-polymerization initiator | IRGACURE 369 | 2 | 2 | 2 | 2 |
| | IRGACURE 819 | 8 | 8 | 8 | 8 |
| Mill base | Mill base 1 | | | | |
| | Mill base 2 | | | | |
| | Mill base 3 | | | | |
| | Mill base 4 | | | | |
| | Mill base 5 | | | | |
| | Mill base 6 | | | | |
| | Mill base 7 | | | | |
| | Mill base 8 | | | | |
| | Mill base 9 | | | | |
| | Mill base 10 | | | | |
| | Mill base 11 | | | | |
| | Mill base 12 | | | | |
| | Mill base 13 | 10 | | | |
| | Mill base 14 | | 10 | | |
| | Mill base 15 | | | 10 | |
| | Mill base 16 | | | | 26 |
| Pigment | (Amount of Y pigment in mill base) | 2 | 2 | 2 | |
| | (Amount of W pigment in mill base) | | | | 13 |
| Polymer | (Specific polymer 1) | | | | |
| | (Specific polymer 2) | | | | |
| | (Specific polymer 3) | | | | |
| | (Specific polymer 4) | | | | |
| | (Specific polymer 5) | | | | |
| | (Specific polymer 6) | | | | |
| | (Specific polymer 7) | | | | |
| | (Specific polymer 8) | | | | |
| | (Comparative polymer 1) | | | | 2.6 |
| | (Comparative polymer 2) | | | | |
| | (Comparative polymer 3) | | | | |
| | (Comparative polymer 4) | 1 | | | |
| | (Comparative polymer 5) | | 1 | | |
| | (Comparative polymer 6) | | | 1 | |

TABLE 2-continued

| Monomer | (PEA in mill base) | 7 | 7 | 8 | 10.4 |
|---|---|---|---|---|---|
| Polymerization inhibitor | TEMPO-OH | 0.2 | 0.2 | 0.2 | 0.2 |
| Evaluation item | Blocking resistance | A | A | C | C |
| | Adhesiveness | C | C | C | C |
| | Storage stability | B | A | B | C |
| | Ejection stability | B | C | A | C |
| | Whether or not purification step is performed by production | Performed | Performed | Not performed | Not performed |

As shown in Table 2, the inkjet recording inks of examples brought about blocking resistance, adhesiveness, and excellent effects. Furthermore, the inkjet recording inks of examples also had excellent storage stability and ejection stability.

In contrast, in a case of the inkjet recording inks of comparative examples not containing the specific polymer, at least one of the blocking resistance and the adhesiveness was poor.

What is claimed is:

1. A pigment dispersion composition comprising:
   a pigment;
   a polymerizable compound; and
   a compound having a structural unit represented by the following Formula (A), a structural unit represented by the following Formula (B), a structural unit represented by the following Formula (C) derived from polyalkylene oxide having a number average molecular weight of equal to or greater than 300 and less than 5,000, a structural unit represented by the following Formula (D), and a structural unit represented by the following Formula (E),
   wherein a mass ratio [(B)/(C)] of the structural unit represented by Formula (B) to the structural unit represented by Formula (C) is 20/80 to 60/40,

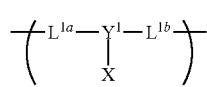

Formula (A)

in the formula (A), each of $L^{1a}$ and $L^{1b}$ independently represents —O— or —NR—; R represents a hydrogen atom or an alkyl group having 1 to 4 carbon atoms; X represents a tertiary amino group or a carboxy group; and $Y^1$ represents a trivalent linking group,

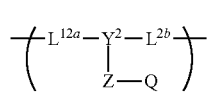

Formula (B)

in the formula (B), each of $L^{2a}$ and $L^{2b}$ independently represents —O— or —NH—; Q represents a group derived from poly(meth)acrylate having a glass transition temperature of equal to or higher than 50° C.; $Y^2$ represents a trivalent linking group; and Z represents a divalent linking group bonded to $Y^2$ and Q,

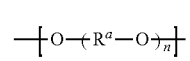

Formula (C)

in the formula (C), $R^a$ represents a linear or branched alkylene group having 2 to 4 carbon atoms; and n is the average addition number of moles of alkylene oxide and represents a number of 6 to 115,

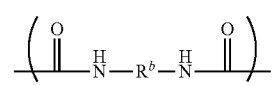

Formula (D)

in the formula (D), $R^b$ represents an alkylene group having 6 to 15 carbon atoms, an arylene group, a divalent linking group in which an arylene group is bonded to an arylene group, or a divalent linking group in which an alkylene group having 6 to 15 carbon atoms is bonded to an arylene group, and

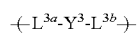

Formula (E)

in the formula (E), each of $L^{3a}$ and $L^{3b}$ independently represents —O— or —NR—; R represents a hydrogen atom or an alkyl group having 1 to 4 carbon atoms; and $Y^3$ represents a divalent polycyclic aromatic hydrocarbon group bonded to $L^{3a}$ and $L^{3b}$.

2. The pigment dispersion composition according to claim 1,
   wherein a ratio of the structural unit represented by Formula (A) to the total mass of all of the structural units of the compound is 2% by mass to 20% by mass.

3. The pigment dispersion composition according to claim 2, further comprising:
   an organic solvent in an amount of equal to or less than 3% by mass with respect to the total mass of the pigment dispersion composition.

4. The pigment dispersion composition according to claim 3,
   wherein the content of a monofunctional monomer in the polymerizable compound is 80% by mass to 100% by mass.

5. The pigment dispersion composition according to claim 2, wherein the content of a monofunctional monomer in the polymerizable compound is 80% by mass to 100% by mass.

6. The pigment dispersion composition according to claim 1, further comprising:
an organic solvent in an amount of equal to or less than 3% by mass with respect to the total mass of the pigment dispersion composition.

7. The pigment dispersion composition according to claim 6,
wherein the content of a monofunctional monomer in the polymerizable compound is 80% by mass to 100% by mass.

8. The pigment dispersion composition according to claim 1,
wherein the content of a monofunctional monomer in the polymerizable compound is 80% by mass to 100% by mass.

9. The pigment dispersion composition according to claim 1, further comprising:
a polymerization initiator.

10. The pigment dispersion composition according to claim 1 that is used as an ink.

11. The pigment dispersion composition according to claim 10 that has viscosity of 3 mPa·s to 50 mPa·s at 25° C.

12. The pigment dispersion composition according to claim 11 that is used as an inkjet recording ink.

13. An inkjet recording method using the pigment dispersion composition according to claim 10.

14. A method for producing a compound, comprising:
obtaining a polyalkylene oxide solution of poly(meth)acrylate by synthesizing poly(meth)acrylate having a structural unit represented by the following Formula (B) in polyalkylene oxide having a number average molecular weight of equal to or greater than 300 and less than 5,000 and having a structural unit represented by the following Formula (C); and
mixing the obtained polyalkylene oxide solution of poly(meth)acrylate, a compound having a structural unit represented by the following Formula (A), a compound having a structural unit represented by the following Formula (D), a compound having a structural unit represented by the following Formula (E), and a radically polymerizable compound to react therewith,
wherein a mass ratio [(B)/(C)] of the poly(meth)acrylate having the structural unit represented by Formula (B) to the polyalkylene oxide having the structural unit represented by Formula (C) is 20/80 to 60/40, and
a value obtained by dividing the total number of moles of the compound having the structural unit represented by Formula (A), the poly(meth)acrylate having the structural unit represented by Formula (B), the polyalkylene oxide having the structural unit represented by Formula (C) and the compound having the structural unit represented by Formula (E) by the number of moles of the compound having the structural unit represented by Formula (D) is 1.0 to 1.25,

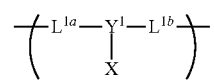

Formula (A)

in the formula (A), each of $L^{1a}$ and $L^{1b}$ independently represents —O— or —NR—; R represents a hydrogen atom or an alkyl group having 1 to 4 carbon atoms; X represents a tertiary amino group or a carboxy group; and $Y^1$ represents a trivalent linking group,

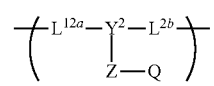

Formula (B)

in the formula (B), each of $L^{2a}$ and $L^{2b}$ independently represents —O— or —NH—; Q represents a group derived from poly(meth)acrylate having a glass transition temperature of equal to or higher than 50° C.; $Y^2$ represents a trivalent linking group; and Z represents a divalent linking group bonded to $Y^2$ and Q,

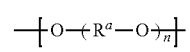

Formula (C)

in the formula (C), $R^a$ represents a linear or branched alkylene group having 2 to 4 carbon atoms; and n is the average addition number of moles of alkylene oxide and represents a number of 6 to 115,

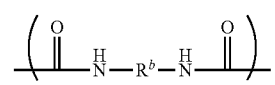

Formula (D)

in the formula (D), $R^b$ represents an alkylene group having 6 to 15 carbon atoms, an arylene group, a divalent linking group in which an arylene group is bonded to an arylene group, or a divalent linking group in which an alkylene group is bonded to an arylene group, and

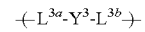

Formula (E)

in the formula (E), each of $L^{3a}$ and $L^{3b}$ independently represents —O— or —NR—; R represents a hydrogen atom or an alkyl group having 1 to 4 carbon atoms; and $Y^3$ represents a divalent polycyclic aromatic hydrocarbon group bonded to $L^{3a}$ and $L^{3b}$.

* * * * *